(12) United States Patent
Gordin

(10) Patent No.: US 8,517,566 B2
(45) Date of Patent: Aug. 27, 2013

(54) APPARATUS, METHOD, AND SYSTEM FOR ROADWAY LIGHTING USING SOLID-STATE LIGHT SOURCES

(75) Inventor: Myron Gordin, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 325 days.

(21) Appl. No.: 12/887,595

(22) Filed: Sep. 22, 2010

(65) Prior Publication Data

US 2011/0074313 A1 Mar. 31, 2011

Related U.S. Application Data

(63) Continuation-in-part of application No. 12/751,519, filed on Mar. 31, 2010.

(60) Provisional application No. 61/254,945, filed on Oct. 26, 2009, provisional application No. 61/246,033, filed on Sep. 25, 2009.

(51) Int. Cl.
*F21V 33/00* (2006.01)

(52) U.S. Cl.
USPC .......... 362/249.02; 362/145; 362/249.03; 362/240; 362/243; 362/247

(58) Field of Classification Search
USPC .............. 362/145, 152, 153, 153.1, 431
See application file for complete search history.

(56) References Cited

U.S. PATENT DOCUMENTS

| | | |
|---|---|---|
| 1,991,584 A | 2/1935 | Strauss |
| 3,265,883 A | 8/1966 | Tolbert |
| 3,343,449 A | 9/1967 | Blackwell et al. |
| 3,740,545 A | 6/1973 | Franklin et al. |
| 4,729,072 A | 3/1988 | Oroza |
| 5,067,062 A | 11/1991 | Rulke |
| 5,402,327 A | 3/1995 | Gordin et al. |
| 5,479,159 A | 12/1995 | Kelly et al. |

(Continued)

FOREIGN PATENT DOCUMENTS

| | | |
|---|---|---|
| CN | 101021300 | * 8/2007 |
| JP | 2004-303602 A | 10/2004 |

(Continued)

OTHER PUBLICATIONS

Fitzpatrick, K. et al. "Driver Eye and Evehicle Heights for Use in Geometric Design", Abstract from http://cat.inist.fr/?aModele=afficheN&cpsidt=1654655, printed from Internet on Sep. 20, 2010. Transportation Research Record ISSN 0361-1981 (1998) 1 page.

(Continued)

*Primary Examiner* — Laura Tso
(74) *Attorney, Agent, or Firm* — McKee, Voorhees & Sease, P.L.C.

(57) ABSTRACT

Disclosed herein are apparatus, methods, and systems for illuminating roadways, paths, tunnels, bridges, and areas adjacent to such in a manner which minimizes glare and/or other adverse lighting effects commonly experienced by night-time drivers. According to aspects of the invention, horizontal and vertical aiming of a plurality of solid-state light sources permits projected light from a fixture to be tailored to roadway features (e.g., bends in the road) and in some cases, permits the mounting height of fixtures to be reduced which can make the envisioned system a cost-effective alternative to traditional roadway lighting.

34 Claims, 24 Drawing Sheets

(56) References Cited

U.S. PATENT DOCUMENTS

| | | | |
|---|---|---|---|
| 5,486,989 | A | 1/1996 | Compton |
| 5,647,661 | A | 7/1997 | Gordin |
| 6,206,546 | B1 | 3/2001 | Krogman |
| 6,220,726 | B1 | 4/2001 | Gordin |
| 6,250,774 | B1 | 6/2001 | Begemann et al. |
| 6,456,960 | B1 | 9/2002 | Williams et al. |
| 6,681,110 | B1 | 1/2004 | Crookham et al. |
| 6,963,175 | B2 | 11/2005 | Archenhold et al. |
| 7,080,921 | B2 | 7/2006 | Feldstein |
| 7,174,260 | B2 | 2/2007 | Tuff et al. |
| 7,307,391 | B2 | 12/2007 | Shan |
| 7,513,639 | B2 | 4/2009 | Wang |
| 7,547,116 | B2 | 6/2009 | Walker et al. |
| 7,654,686 | B2 | 2/2010 | Oza |
| 7,778,635 | B2 | 8/2010 | Crookham et al. |
| 7,780,314 | B2 | 8/2010 | Seabrook |
| 7,914,176 | B2 | 3/2011 | Stanley et al. |
| 8,057,082 | B2 | 11/2011 | Seabrook |
| 8,100,552 | B2 | 1/2012 | Spero |
| 2005/0068765 | A1 | 3/2005 | Ertze Encinas et al. |
| 2008/0273333 | A1* | 11/2008 | Berns et al. ............... 362/294 |
| 2009/0175038 | A1* | 7/2009 | Rooymans ............... 362/249.02 |
| 2009/0323330 | A1 | 12/2009 | Gordin et al. |
| 2010/0002445 | A1* | 1/2010 | Tseng et al. ............. 362/296.01 |
| 2010/0103672 | A1 | 4/2010 | Thomas et al. |
| 2010/0195326 | A1 | 8/2010 | Boxler et al. |
| 2011/0074313 | A1 | 3/2011 | Gordin |

FOREIGN PATENT DOCUMENTS

| | | |
|---|---|---|
| KR | 20-0385146 Y1 | 5/2005 |
| KR | 10-0648381 B1 | 11/2006 |
| KR | 10-2008-010943 A | 12/2008 |
| WO | WO 2011/037993 A2 | 3/2011 |
| WO | WO 2011/037993 A3 | 3/2011 |

OTHER PUBLICATIONS

Sivak, Michael et al., "The Locations of Headlamps and Driver Eye Positions in Vehicles Sold in the U.S.A." UMTRI-96-36, The University of Michigan Transportation Research Institute, Nov. 1996, 17 pages.

Stonex, K.A., "Driver Eye Height and Vehicle Performance in Relation to Crest Sight Distance and Length of No-Passing Zones. I. Vehicle Data", Abstract from TRB Publications Index, pubsindex.trb.org printed from Internet on Sep. 20, 2010. Highway Research Bulletin 1958 (1 page).

Cree, Cree XLamp XR-E and XR-C LED, CLD AP12 Rev. 8, Brochure, pp. 1-15, Copyright 2004-2010 Cree, Inc.

International Search Report, Musco Corporation et al., PCT/US2010/049807, dated Jun. 23, 2011.

English Translation (Machine-Translated document KIPRIS), KR 10-2008-010943—Byucksan Engineering co., Ltd. et al.

English Translation (Machine-Translated document KIPRIS), KR 10-0648381—Lee, Mi-Ae et al.

Bullough, John D. et al., "Discomfort and Disability Glare from Halogen and HID Headlamp Systems," SAE Technical Paper Series 2002-01-0010, SAE 2002 World Congress, Mar. 2002, pp. 1-7.

Frazer, Jim, "Saving Energy & Resources with New Street & Area Lighting Technology," IMSA Journal, Sep./Oct. 2009, pp. 34-36.

"Tunnel Lighting Fixtures," Holophane, HL-1364, Feb. 2002, pp. 1-16.

Lutkevich, Paul, "Its Time to Look Beyond the Roadway: New Lighting Standards," PB Network issue No. 49, vol. 15, No. 1 (Mar. 2001): 35-36. http://www.pbworld.com/news_events/publications/network/issue_49/49_15_LutkevichP_TimeLookBeyond.asp Mar. 2001.

Robinson, Gail M., "Smart Photoelectric Control Senses Lighting Problems," Design News, Apr. 24, 1995, p. 99.

Shaflik, Carl, "Environemental Effects of Roadway Lighting," International Dark-Sky Association—Information Sheet 125, Aug. 1997, pp. 1-15.

* cited by examiner

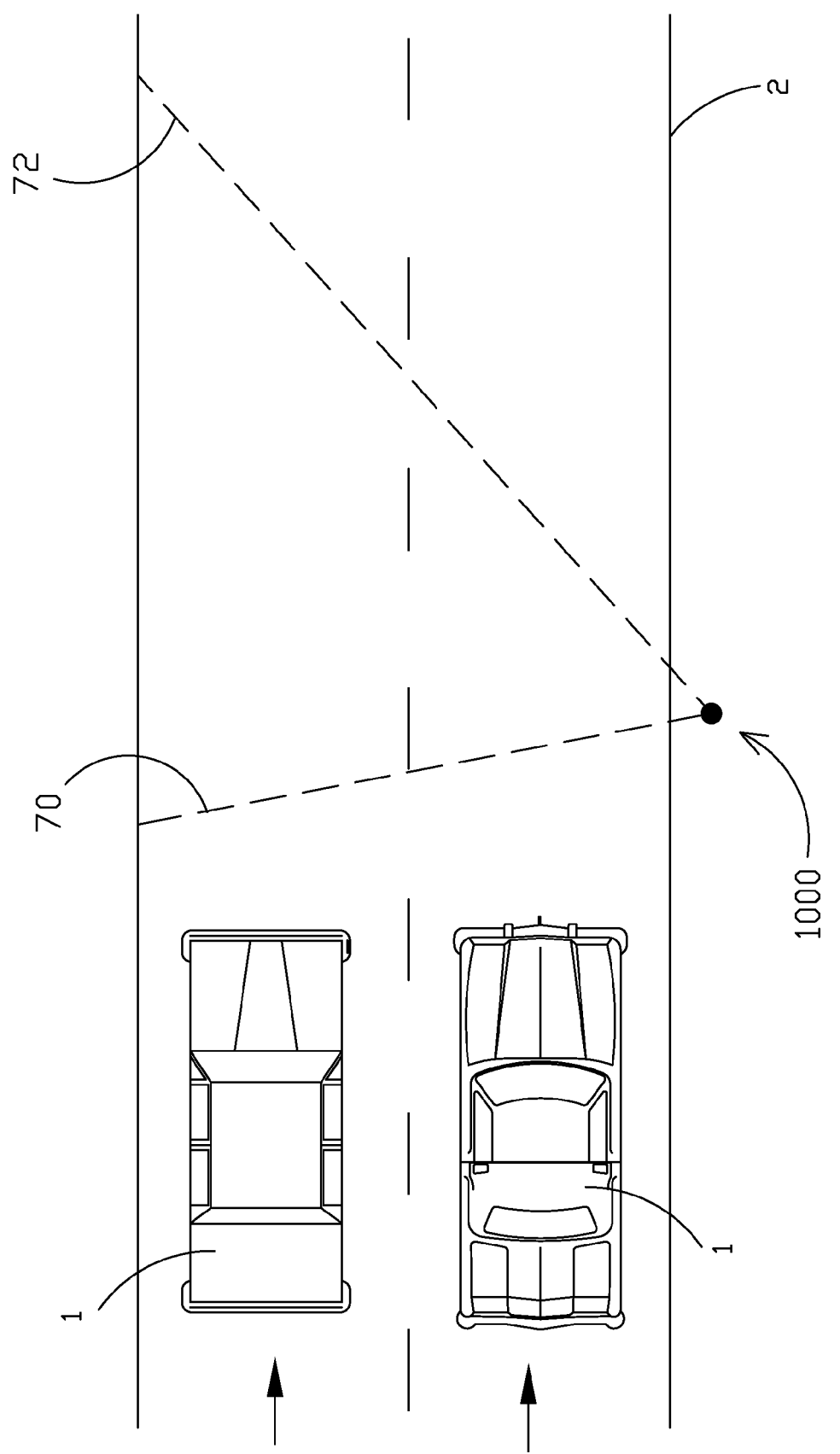

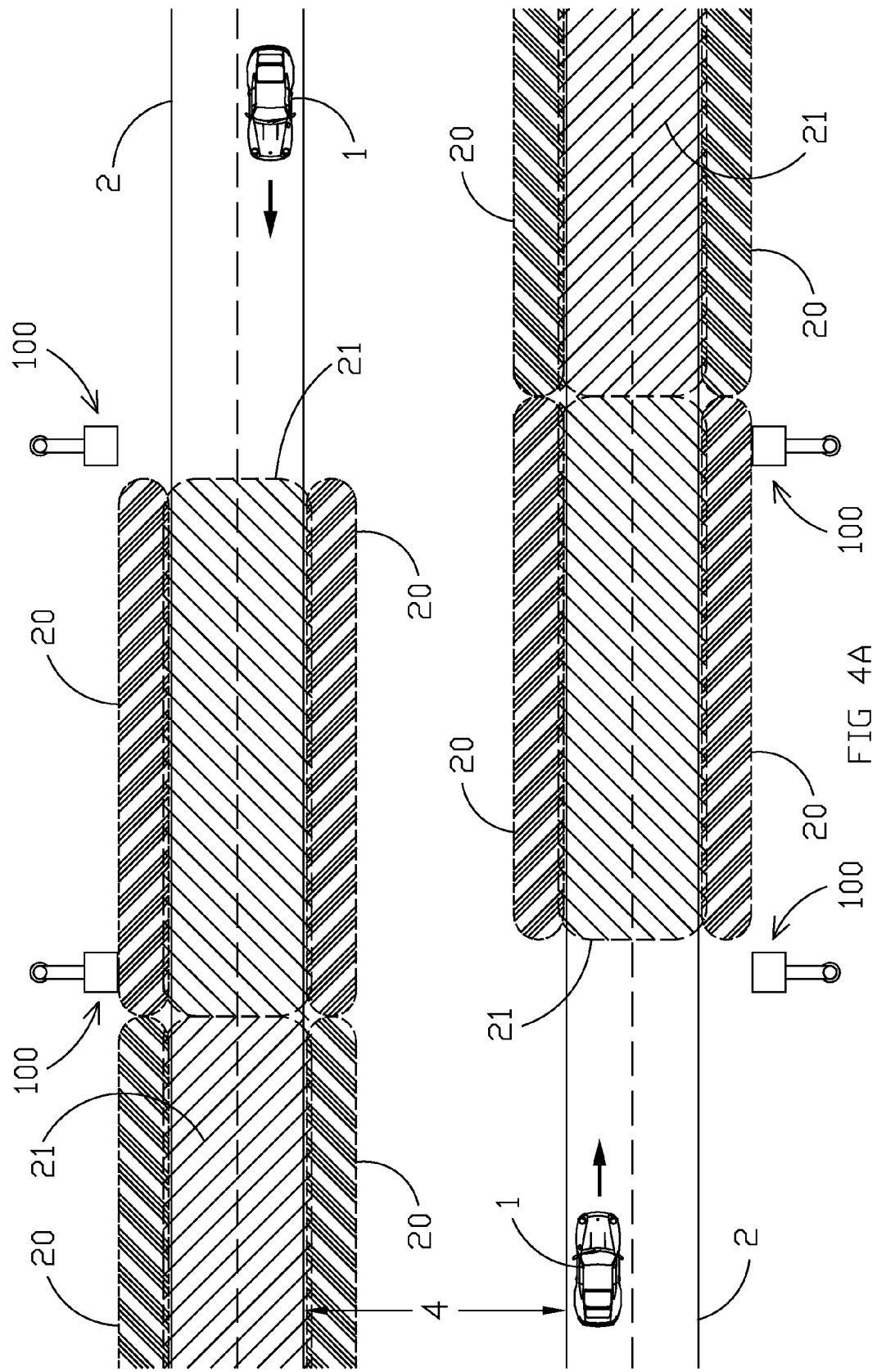

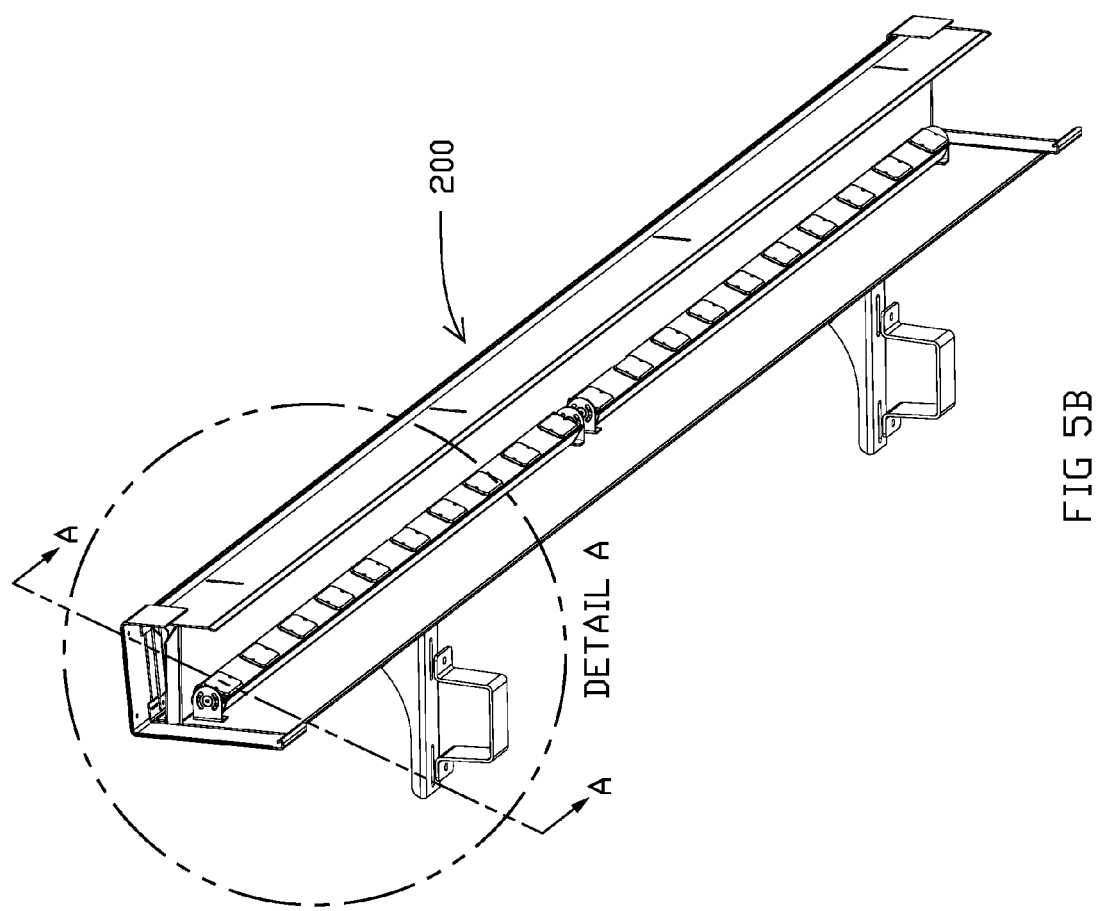

DETAIL A

DETAIL A

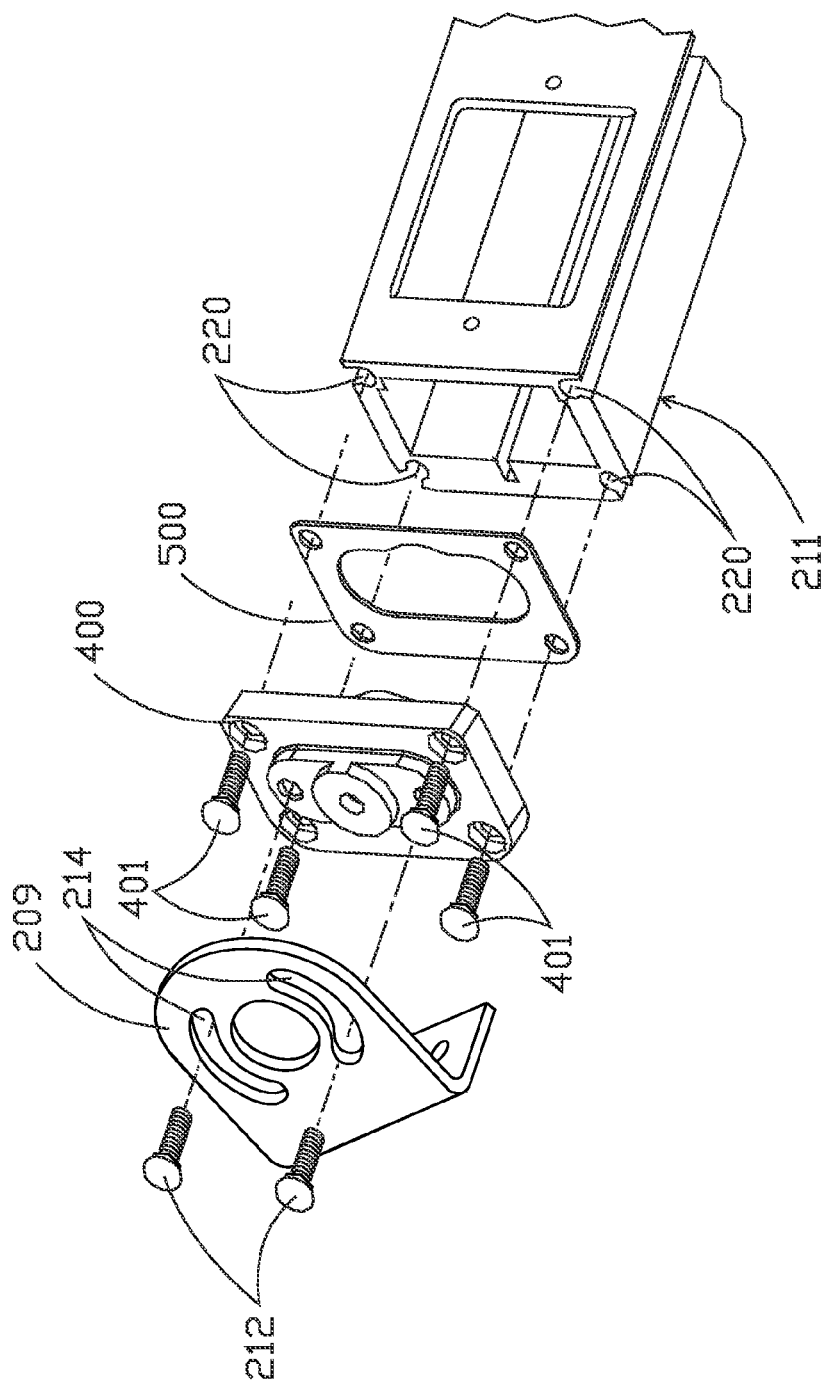

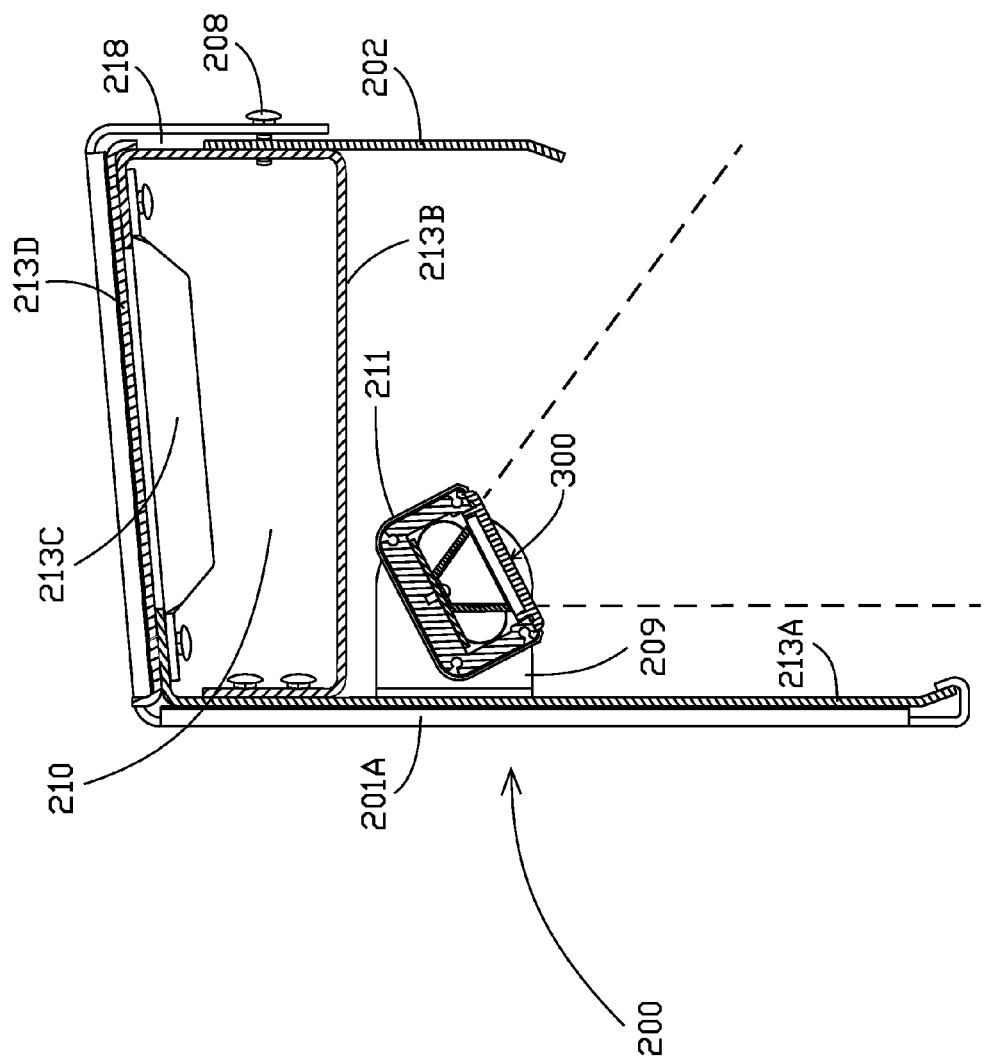

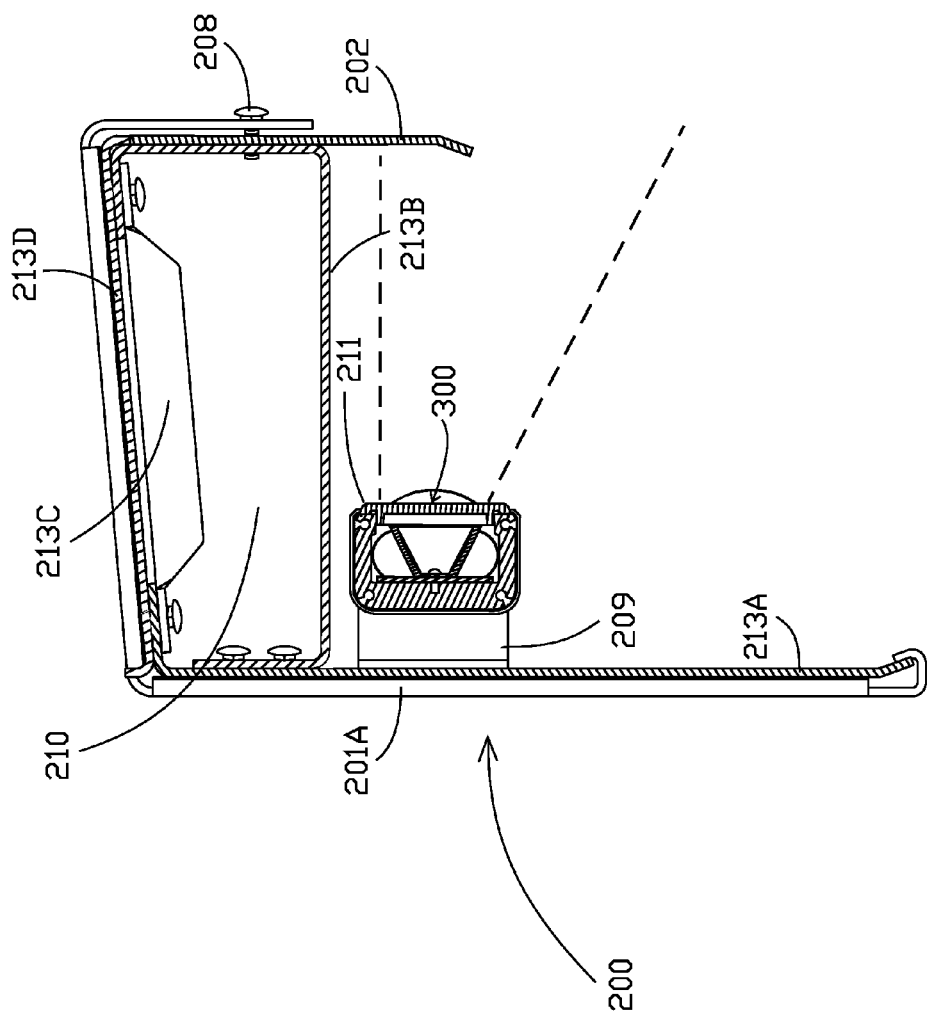

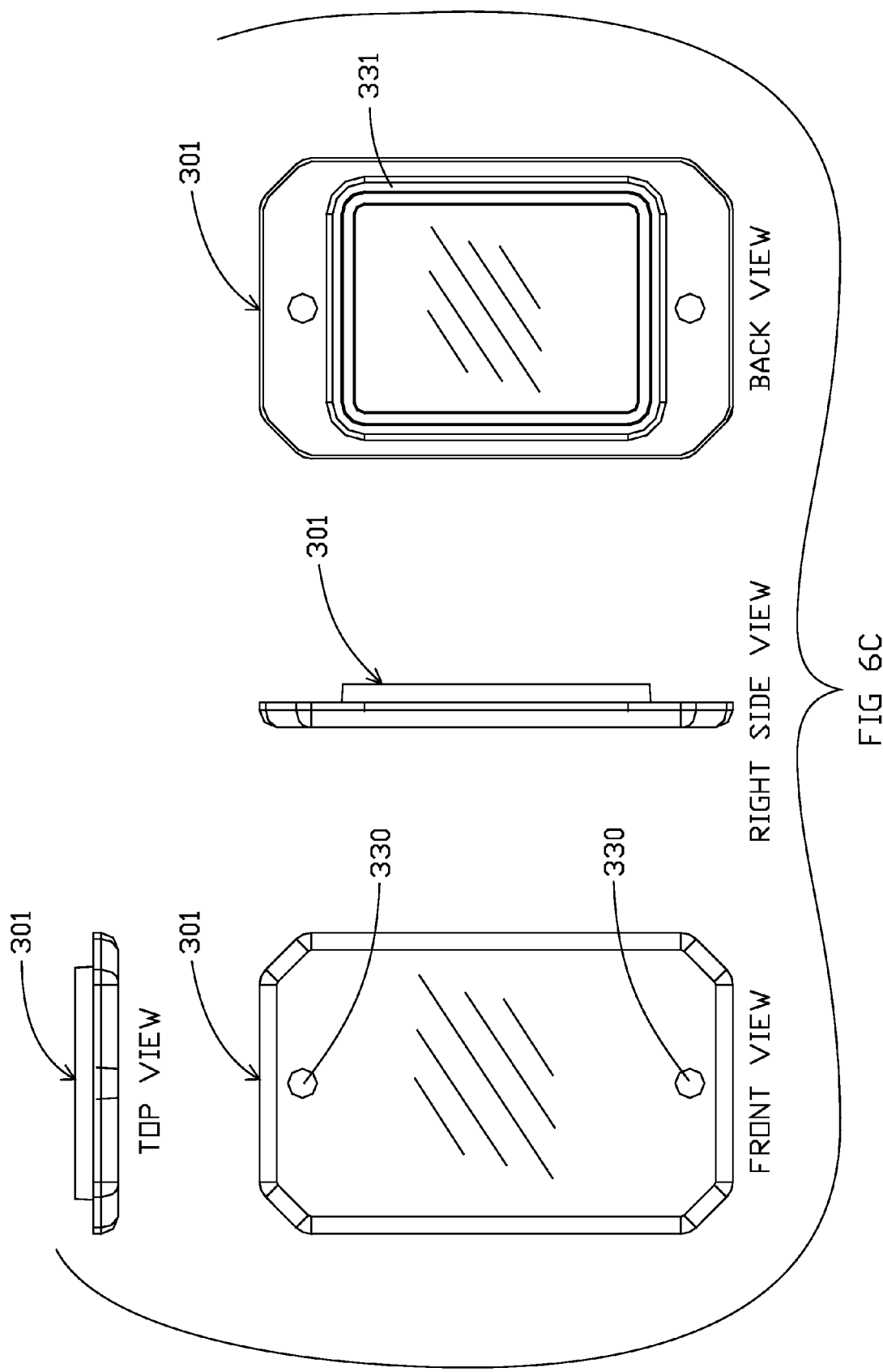

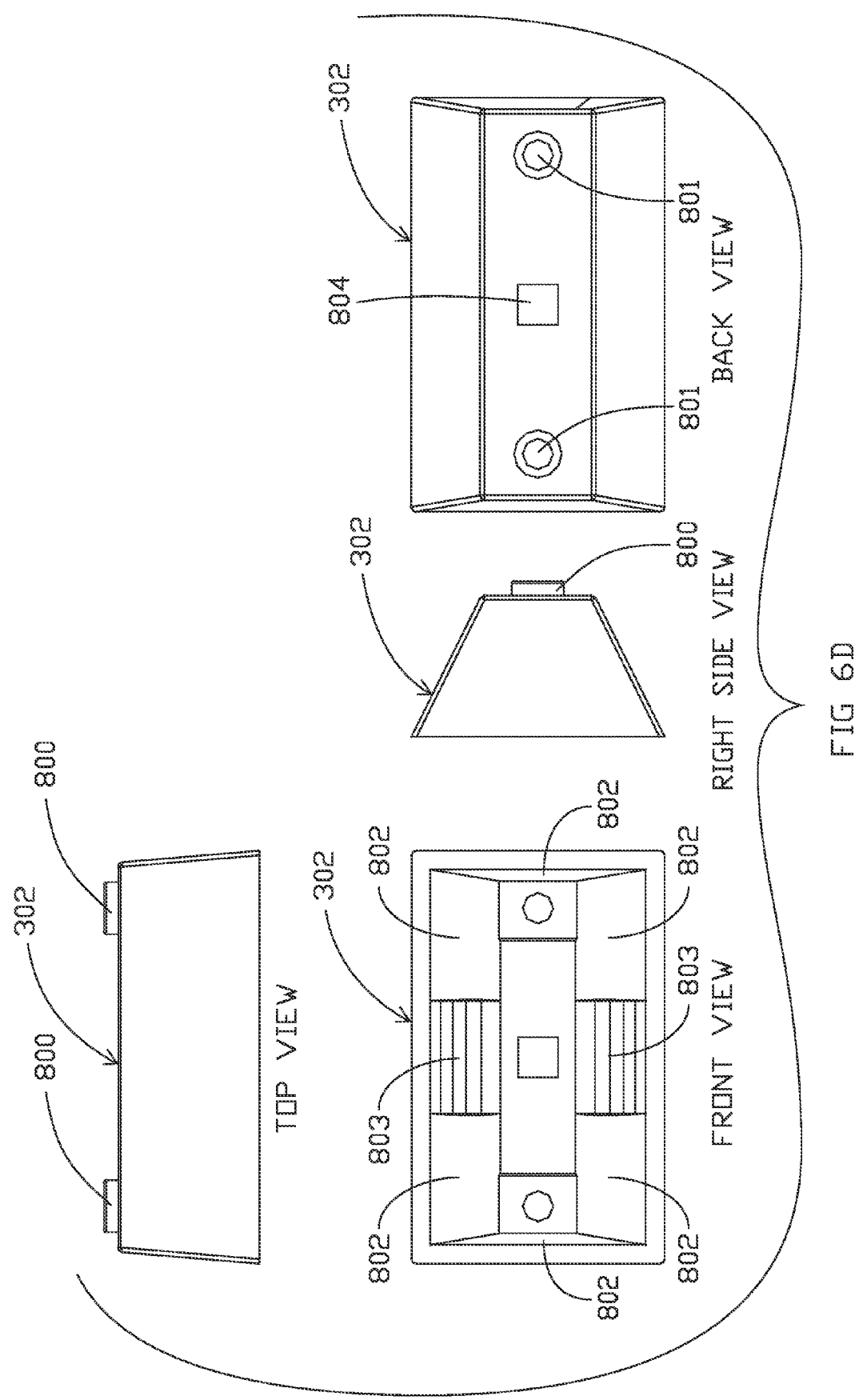

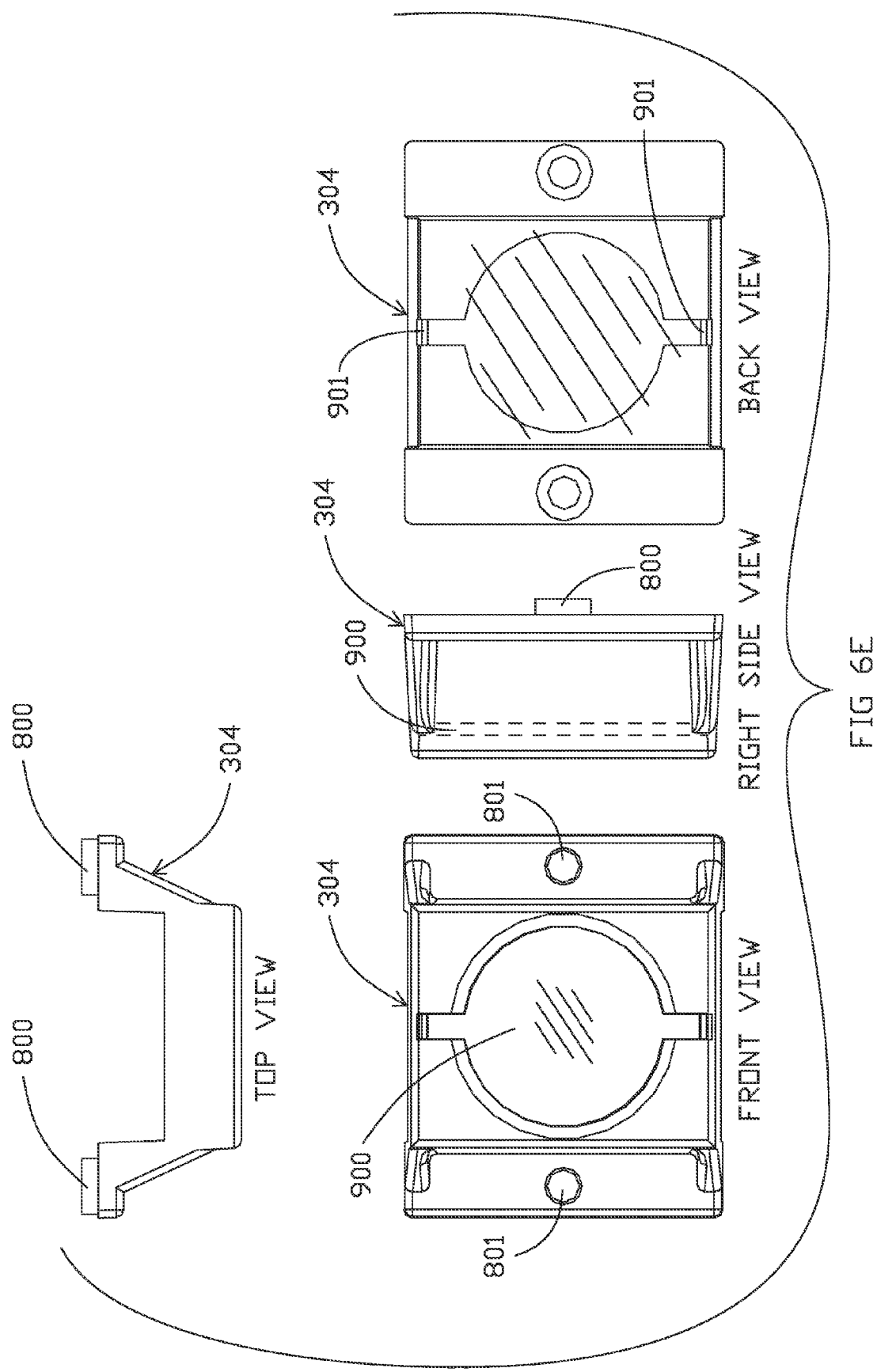

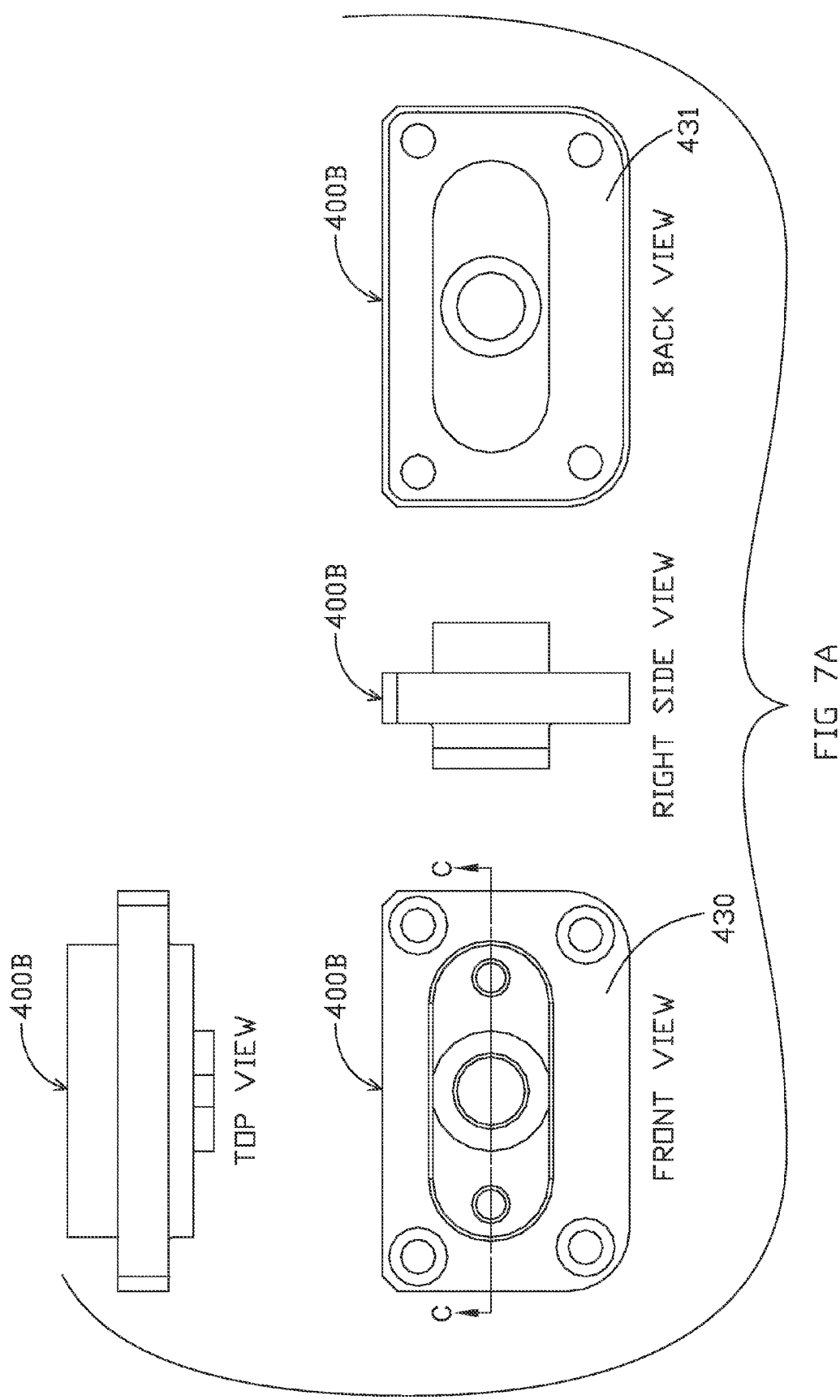

SECTION C-C

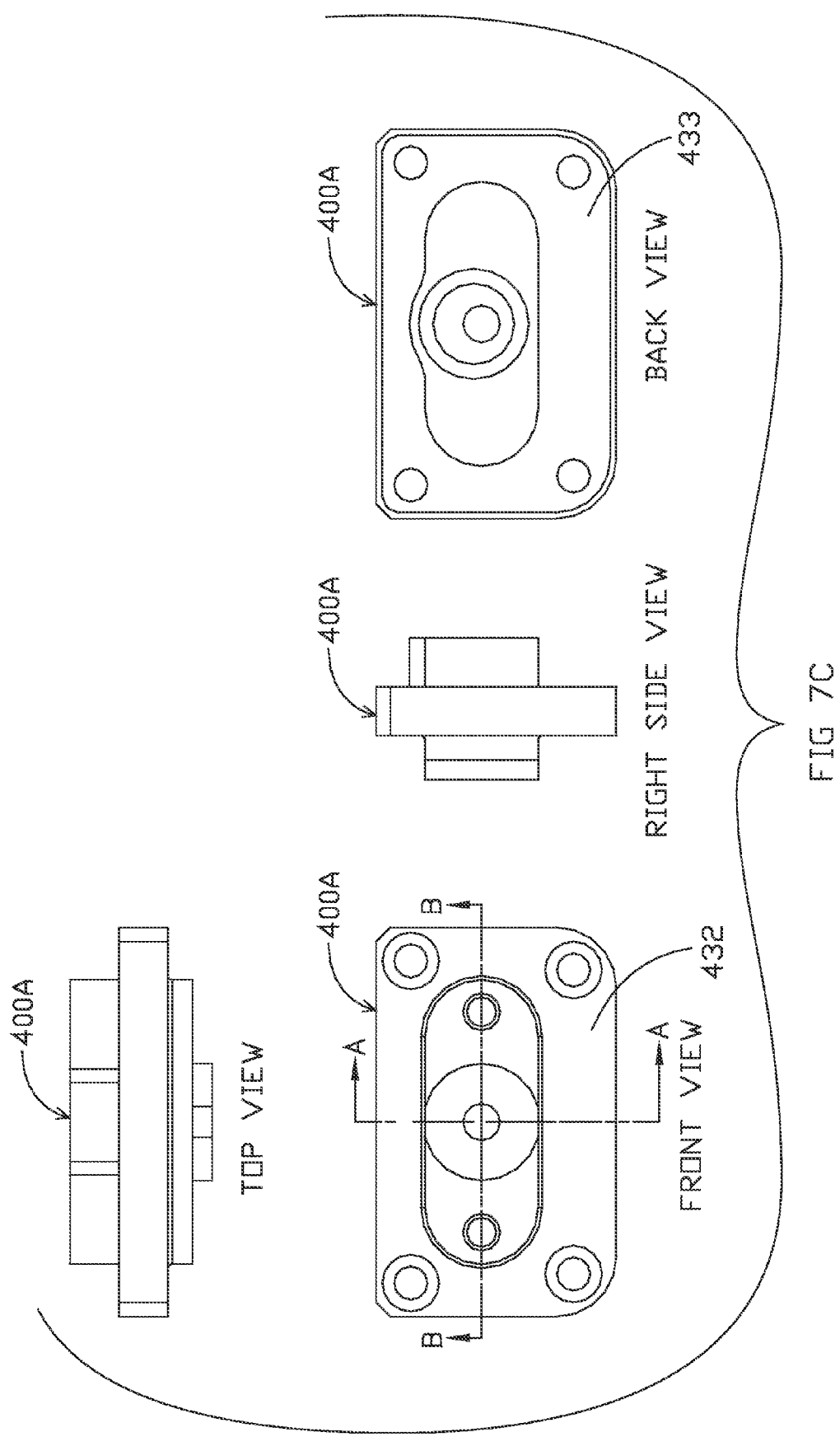

SECTION B-B

SECTION A-A

APPARATUS, METHOD, AND SYSTEM FOR ROADWAY LIGHTING USING SOLID-STATE LIGHT SOURCES

CROSS-REFERENCE TO RELATED APPLICATIONS

This application claims priority under 35 U.S.C. §119(e) of provisional application Ser. Nos. 61/246,033 filed Sep. 25, 2009 and 61/254,945 filed Oct. 26, 2009, which applications are hereby incorporated by reference in their entireties.

This application also claims benefit under 35 U.S.C. §120 to U.S. application Ser. No. 12/751,519, filed Mar. 31, 2010 which application is hereby incorporated by reference in its entirety.

BACKGROUND OF THE INVENTION

The present invention generally relates to the illumination of roadways at night. More specifically, the present invention relates to the use of solid-state light sources in roadway lighting as a way to improve over state of the art roadway lighting.

The adequate illumination of roadways is known to be problematic, particularly because of the competing interests in designing roadway lighting systems. For example, one usually seeks to minimize the cost of a lighting system (both capital and operating) but must also consider such things as glare, lighting uniformity, and other parameters which are well known in the art and regulated by the industry; British Standard (BS) 5489-1:2003 and Illuminating Engineering Society (IES) RP-8-00 are but two examples of the standards and codes which govern roadway lighting design.

To better understand the conflicting design interests, some discussion of how roadway lighting impacts a driver is warranted. As is well known, a roadway is typically illuminated by a plurality of light fixtures elevated and generally positioned above the roadway by a support structure (also referred to as a pole). Each fixture typically includes a single light source (e.g., metal halide (MH) or high pressure sodium (HPS)) and some form of optic (e.g., reflector, visor, lens, etc.) to provide limited control of the light projected therefrom. Each elevated fixture is aimed generally downward and located a significant distance from the next elevated fixture (e.g., on the order of seven times the mounting height) so to illuminate a significant stretch of road (also referred to as a carriageway).

As is well known, a night-time driver has specific vision requirements to ensure maximum visibility and driver safety. The typical night-time driver requires a minimum luminous intensity to perform the visual task (e.g., perceive objects on the roadway, respond to signage, maneuver between lanes, etc.) and a minimum contrast to distinguish between objects and the background; this is particularly true for objects in a driver's periphery as a night-time driver is (i) less able to perceive contrast than a daytime driver and (ii) less able to perceive contrast for objects that are not in detail (objects in one's periphery typically being in less focus than objects directly in one's line of sight).

So as an example, the cost of a roadway lighting system could be reduced by reducing the mounting height of the lighting fixtures; however, if the fixtures are lowered enough that a driver can directly see the light source, the perceived brightness of the light source can diminish the driver's ability to perceive contrast and, if the driver views the light source for a prolonged period, cause the driver's eyes to adapt to the brighter source and thus, have insufficient luminous intensity (also referred to as illumination or light level) for the visual task.

As another example, adding additional poles with corresponding fixtures to a roadway lighting system could reduce or eliminate areas of insufficient luminous intensity (i.e., improve the lighting of poorly-lit areas), thereby improving lighting uniformity and driver visibility; however, this would greatly increase the cost of the lighting system as it is well known that the cost of a support structure can equal that of the fixture itself, if not exceed the cost of the fixture. Alternatively, additional fixtures could be added to the existing poles and aimed at portions of the roadway with lower light levels; however, adding fixtures to an existing pole is no simple task. Since traditional light sources are large and the fixtures are aimed generally downward, introduction of additional fixtures aimed at various angles requires large visors to provide a desired cutoff so to prevent glare and other adverse lighting conditions already described. Care must be taken so that one fixture's cutoff does not adversely affect another fixture's cutoff. Further, a pole must be substantial enough to both provide the surface area for affixing the new fixtures and withstand anticipated wind loading.

Of course, some roadway lighting applications cannot make use of large support structures. For example, on bridges and in tunnels fixtures are typically mounted to walls, dividers, medians, or other existing structural features at or near the estimated eye height of a driver. Said fixtures cannot be aimed generally downward and provide adequate illumination of the roadway and so are aimed at a shallow angle; however, the aiming angle must be carefully selected so to avoid being directly viewable by the driver (the dangers of which have been described). One proposed solution is to combine the low mounting height with directional illumination (e.g., fixtures aimed so to project light in the direction a vehicle is traveling). One example is the MIRTRAN™ system commercially available from MUSCO® Lighting of Oskaloosa, Iowa, USA and commonly used to illuminate racetracks; see also U.S. Pat. Nos. 5,402,327, 5,647,661, and 6,220,726. Systems like MIRTRAN™ meet the strict needs of racecar driving (e.g., very high speeds, color and light levels in accordance with television broadcast requirements, etc.) but are somewhat overspecialized for traditional roadway lighting; further, systems like MIRTRAN™ still employ a single, large light source with limited control of the light projected therefrom.

So it can be seen that the current state of the art of roadway lighting is limited by conflicting design factors. The art would benefit from apparatus and methods for adequately illuminating a roadway in a manner that does not adversely affect a driver's visibility but also maintains cost-effectiveness. Thus, there is room for improvement in the art.

SUMMARY OF THE INVENTION

The emergence of light emitting diodes (LEDs) and other solid-state devices as increasingly affordable light sources offers the potential for use in roadway lighting, particularly because a plurality of said light sources can be contained in a single fixture but controlled independently; this permits customization of light projected therefrom far beyond what is possible and/or cost-permissible using traditional light sources.

Envisioned are apparatus, methods, and systems whereby a plurality of solid-state light sources in a fixture may be aimed, collimated, or otherwise controlled so to suitably illuminate a roadway (or the like) while preserving driver visibility, and in a manner that provides benefits beyond merely increasing the number of light sources in a fixture. Beyond the benefit of increased aiming capabilities which, for example, allows light to be projected according to a complex beam pattern, some subset of the solid-state light sources could be of differing color properties so to aid in improving visibility during particular environmental conditions. Further, said light sources could be controlled remotely such that they can be selectively turned on, off, or dimmed, for example, according to need or preference. As is well known in the art, traditional light sources (e.g., HPS, MH, etc.) are somewhat limited in their selectable color properties and require significant time to reach maximum luminous output after being turned off, thereby limiting their effectiveness in responding to changing driving conditions.

It is therefore a principle object, feature, advantage, or aspect of the present invention to improve over the state of the art and/or address problems, issues, or deficiencies in the art.

Further objects, features, advantages, or aspects of the present invention may include one or more of the following:
  a. apparatus and methods for adequately illuminating, a roadway, path, bridge, tunnel, parking lot, or areas adjacent to such during periods of reduced visibility;
  b. apparatus and methods for minimizing glare and/or other adverse lighting effects commonly experienced by roadway drivers; and
  c. apparatus and methods for operating a solid-state light source roadway lighting system such that cost-effectiveness may be realized.

One system according to aspects of the present invention comprises fixtures including a plurality of solid-state light sources, each of which may be of selectable optical properties, aiming, color, or the like. Said fixtures are elevated at or near driver eye height on a bridge or in a tunnel, for example, and are designed so to (i) illuminate the roadway, (ii) provide a reference point for drivers, and (iii) greatly reduce or eliminate glare for the typical driver. It is of note that described herein glare is defined as any perceived brightness which interferes with a driver's vision and is not limited to a type of glare (e.g., discomfort glare) or a direction of viewing (e.g., directly at the light source).

These and other objects, features, advantages, or aspects of the present invention will become more apparent with reference to the accompanying specification and claims.

BRIEF DESCRIPTION OF THE DRAWINGS

From time-to-time in this description reference will be taken to the drawings which are identified by figure number and are summarized below.

FIGS. 2A-C illustrate various methods of adjusting the aiming of roadway lighting fixtures in the horizontal plane according to aspects of the present invention.

FIG. 5B illustrates a perspective view of an exemplary apparatus for producing the illumination diagrammatically illustrated in FIG. 5A; for clarity, bolts and analogous components have been removed.

FIGS. 5C-E illustrate features of the alternative exemplary apparatus according to Detail A of FIG. 5B. FIG. 5C illustrates, in particular, one form of connector 201. FIG. 5D illustrates, in particular, an alternative form of connector 201. FIG. 5E illustrates in enlarged exploded perspective view the components between plate 209 and housing 211.

FIGS. 5F and G illustrate, in a section view taken transversely through the part and viewed along line A-A of FIG. 5B, two possible orientations of visor 202 and housing 211.

FIGS. 7A-E illustrate various views of two forms of an end cap 400 for use with plate 209 and housing 211 according to FIG. 5E.

DETAILED DESCRIPTION OF EXEMPLARY EMBODIMENTS

A. Overview

Figure 1:
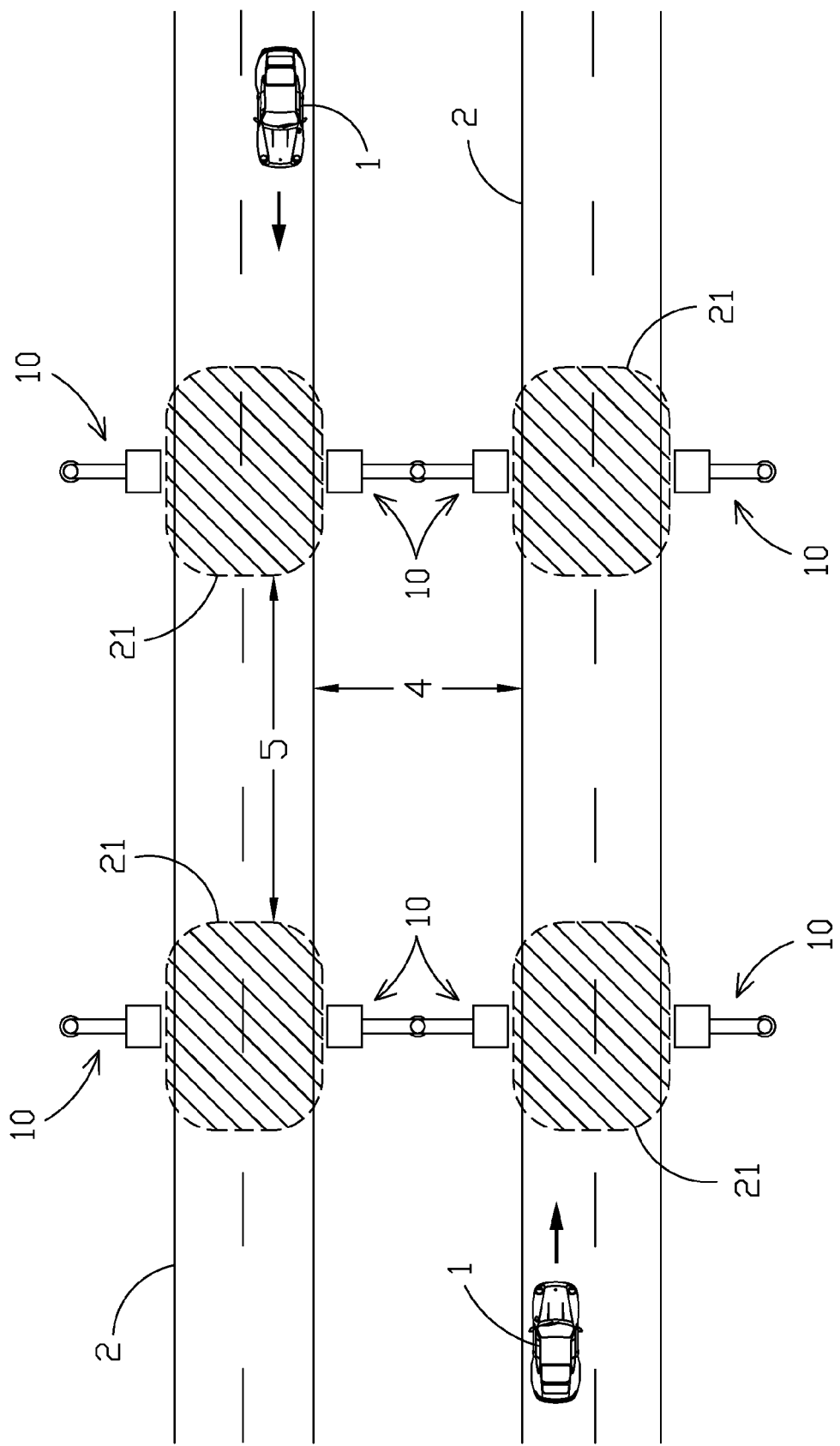
FIG. 1 diagrammatically illustrates illumination of a typical roadway using traditional lighting methods.

To further an understanding of the present invention, specific exemplary embodiments according to the present invention will be described in detail. Frequent mention will be made in this description to the drawings. Reference numbers will be used to indicate certain parts in the drawings. The same reference numbers will be used to indicate the same parts throughout the drawings.

The exemplary embodiments envision apparatus, methods, and systems which employ a plurality of highly controlled solid-state light sources to adequately illuminate a roadway, path, bridge, tunnel, parking lot, or areas adjacent to such in a manner that reduces glare, diminishes the effects of conditions that reduce visibility, improves cost-effectiveness when compared to traditional lighting systems, and is adapted for remote control. As described herein, apparatus, methods, and systems make use of LEDs for roadway lighting; however, other light sources (e.g., lasers) and other applications (e.g., racetracks) are possible, and envisioned.

A typical roadway lighting system may generally be characterized with respect to FIG. 1. As can be seen, a vehicle 1 travels along a roadway 2 illuminated by lighting fixtures 10; it is of note that, as illustrated, travel in both lanes on either side of median 4 (also referred to as a central reservation) is in the same direction and indicated by arrows. As previously stated, fixtures 10 comprise a single HPS or MH light source—typically rated for operation at 150-250 W—and are aimed in a downward fashion so to illuminate the area generally below the fixture. The spacing between and the mounting height of fixtures 10 depends on a variety of factors (see, for example, European Standard EN 5489-1:2003), but for the system illustrated in FIG. 1 a mounting height of 12-15 meters and a spacing between fixtures of 60-80 meters is common; the significant mounting height ensures a driver does not experience glare from directly viewing the light source. However, the combination of the significant mounting height, spacing between, and generally downward aiming of the fixtures leads to well-lit areas 21 of roadway 2 with more poorly illuminated sections 5 interposed. As is well known in the art, illumination such as that diagrammatically illustrated in FIG. 1 is undesirable for night-time driving because of the accommodation reflex of the human eye; namely, when a driver approaches well-lit areas 21 the pupil contracts quickly but when the driver approaches poorly-lit sections 5 the pupil is much slower to dilate and thus, visibility is diminished.

Figure 2A:
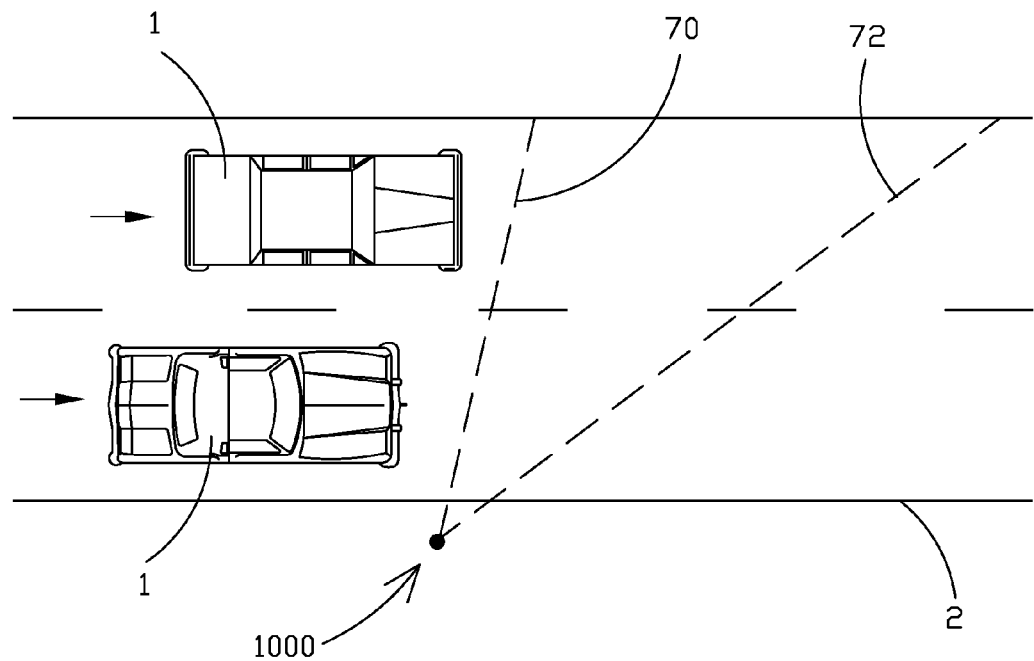
Figure 2B:
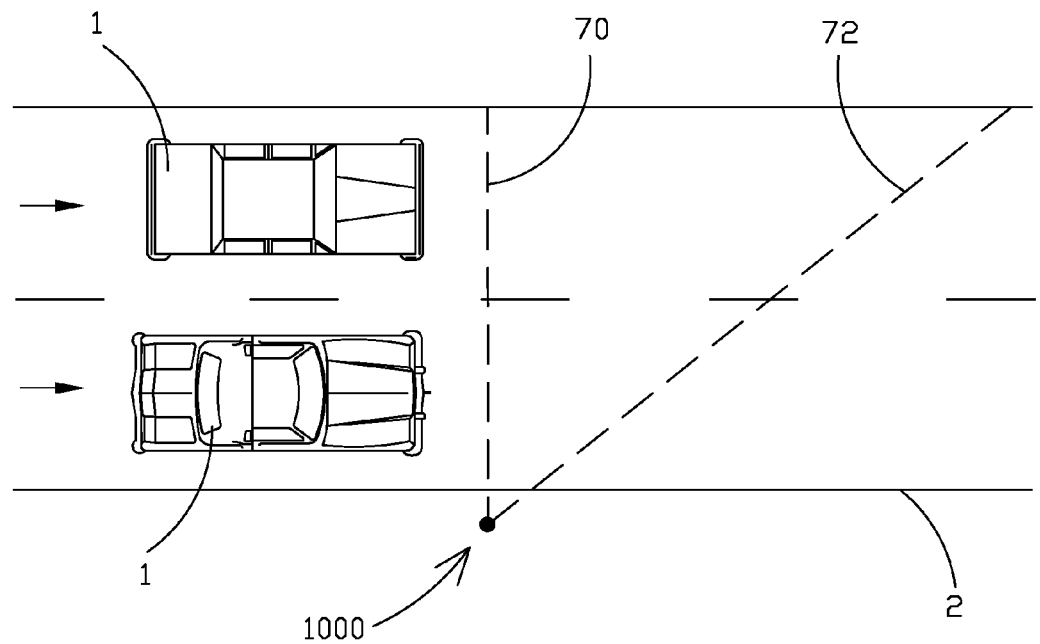

One approach described herein is to change the way in which fixtures are aimed in the horizontal plane. For example, FIGS. 2A and B illustrate two lanes of traffic flowing in the same direction similar to that illustrated in FIG. 1. To control the amount of glare a driver experiences, horizontal beam control from a fixture 1000 is such that edge 70 of the beam is projected at an angle generally forward of the driver (see FIG. 2A) or at a nearly right angle to the driver (see FIG. 2B) so the light source is not in direct view of the driver. Likewise, edge 72 is projected at an angle forward of the driver (e.g., on the order of 20 degrees) so the light source is not in direct view of the driver via the rearview minor. Of course, if it is desirable to have some light directed towards oncoming traffic, edge 70 could be restricted to a few degrees further toward the driver; this is illustrated in FIG. 2C. This approach permits the mounting height of fixtures 1000 to be reduced (e.g., on the order of several meters)—thereby reducing the cost to illuminate roadway 2—without increasing glare for traffic flowing in a single direction.

Figure 3A:
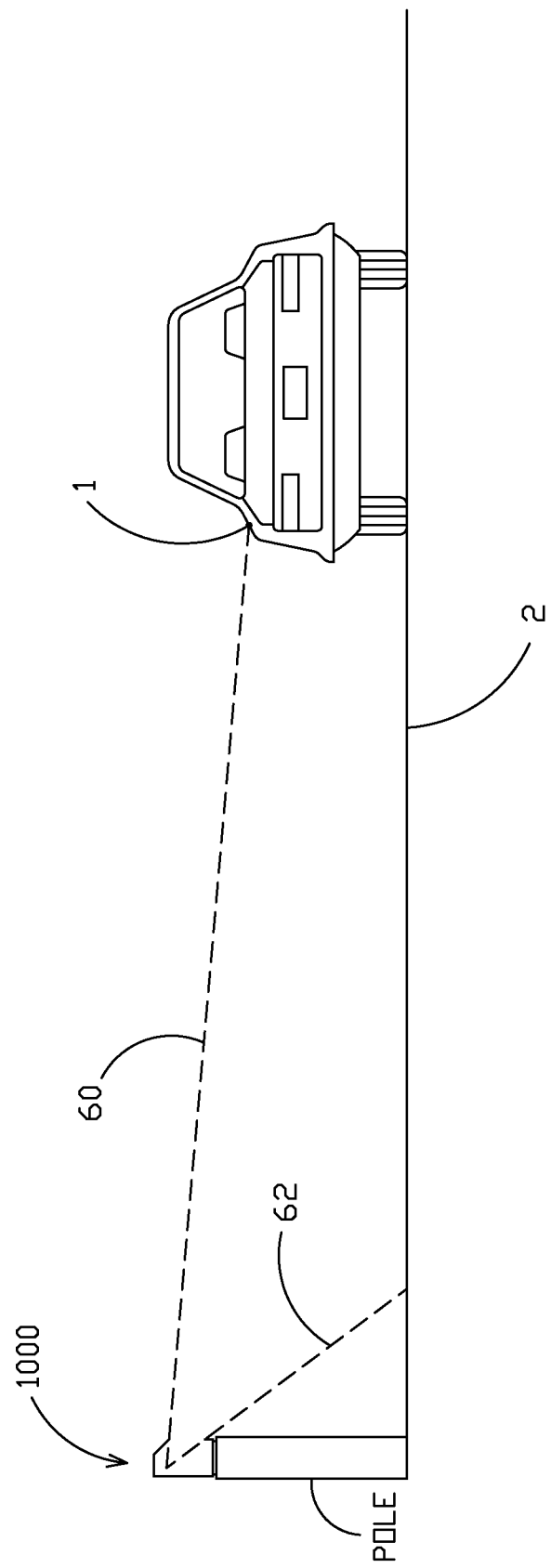
FIGS. 3A and B illustrate various methods of adjusting the aiming of roadway lighting fixtures in the vertical plane according to aspects of the present invention.

Another approach described herein is to change the way in which fixtures are aimed in the vertical plane. For example, FIG. 3A illustrates one lane of traffic as perceived by a driver in the lane. To control the amount of glare a driver experiences, vertical beam control from a fixture 1000 is such that bottom edge 62 of the beam is projected at an angle generally downward from fixture 1000 (e.g., on the order of 45 degrees down from horizontal) so to illuminate the area directly in front of fixture 1000. Top edge 60 of the beam projected from fixture 1000 is aimed so to strike vehicle 1 just below the window (i.e., just below the average driver's eye height—meaning the position of a typical driver's eyes above the roadway surface when operating a vehicle along the roadway); the center of the beam (i.e., what is generally accepted as its brightest point) typically strikes vehicle 1 much lower (e.g., near the top of the wheels), though this is a function of the positioning of a visor or other light-directing apparatuses.

The exact angle cat top edge 60 relative to the mounting height of fixture 1000 and where top edge 60 strikes vehicle 1 can vary depending on a variety of factors. For example, the average driver's eye height is 1.08 meters (3.5 feet) above the roadway surface for passenger cars and 2.4 meters (8.0 feet) for light trucks and vans (American Association of State Highway Transportation Officials, *A Policy on Geometric Design of Streets and Highways* (2001), sometimes called the AASHTO "Green Book"). Actual driver's eye height can vary from vehicle to vehicle (e.g., is higher in an over-the-road truck than a compact car) and person to person (e.g., is higher for taller persons). Regardless, a driver's eye height is substantially less than the typical 12-15 meter mounting (or more) height for typical pole-mounted street or roadway lights) and is typically lower than the maximum vertical height or dimension of the vehicle being driven. Of course, most roadways are adapted for a variety of vehicles of different sizes, including maximum vertical height or dimension. Though there is a typical range of such maximum dimensions, the term as used herein is not limited to any one height, but is intended to convey the idea of monitoring height on the order of the eye height of drivers in typical automobiles (cars and trucks) traversing the particular roadway.

Figure 3B:
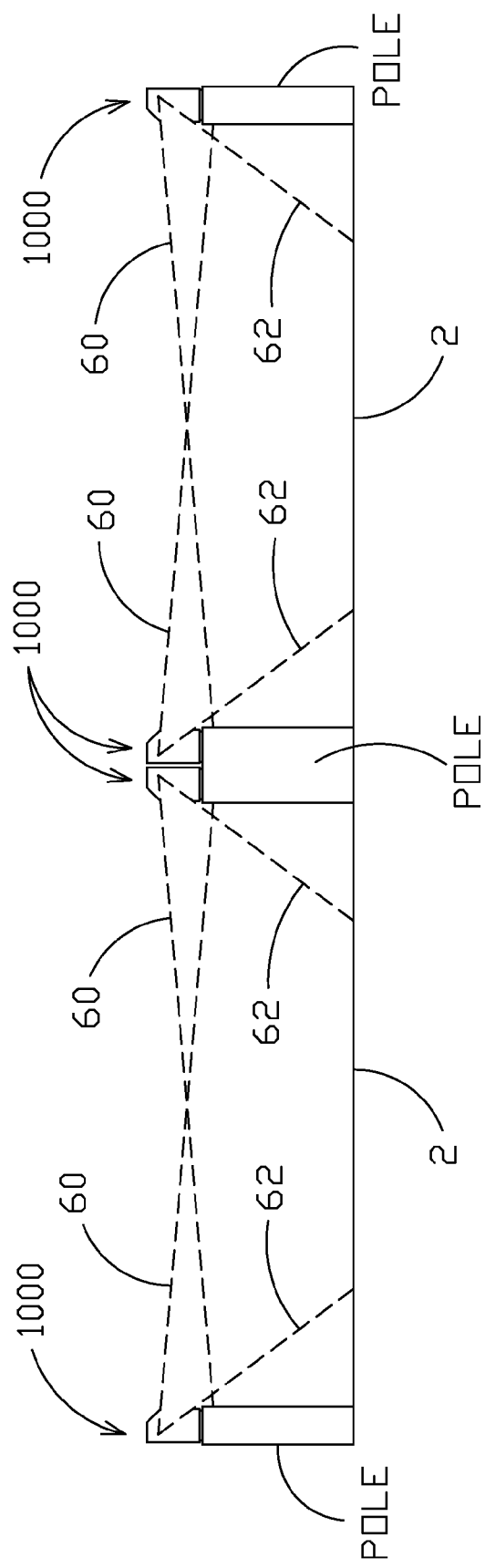

Given the numerous factors involved with vertical aiming, it may be preferable to design for a known height. For example, depending on the number of lanes in roadway 2, it may be necessary to provide fixtures 1000 on both sides of the road so to adequate illuminate the entire width of roadway 2; this is generally illustrated for a divided roadway in FIG. 3B. As can be seen in FIG. 3B, top edge 60 of the beam projected from each fixture 1000 is aimed so to strike the top edge of a pole on the other side of the lane (of course, concrete dividers, guardrails, or the like could be used in place of poles); this still eliminates glare for the majority of drivers, as the typical pole height in this example is on the order of one meter (e.g., a typical concrete divider is on the order of eighty centimeters). So for the example in FIG. 3B, a designer would know the width of roadway 2 and the height of the pole and thus, would easily be able to determine the desired vertical aiming angle of fixture 1000 so to produce appropriate edges 62 and 60.

Thus, as can be seen and appreciated by one in the art, the angles of beam edges 60, 62, 70, and 72 relative to vehicle 1 depends on the setback of fixture 1000 relative to roadway 2, the number of lanes, the width of lanes, the height of each fixture 1000, and the like. As such, a preferred embodiment includes one or more of an adjustable visor or other optic, a plurality of pivotable LEDs, and apparatus for positioning the fixture; this permits significant aiming flexibility such that the envisioned lighting system could be used to illuminate complex roadway features (e.g., bends in the road) without adding significant cost to the system. For example, as has been stated, traditional light sources are aimed generally downward from a significant mounting height and the light projected therefrom not well controlled; this limits the projected beam patterns to a relatively few possibilities (see, for example, Beam Types I-V as defined by the aforementioned IES and commonly used in roadway lighting design). While adequate for many roadway configurations, if a roadway had a complex feature—a classic example being a cloverleaf interchange which is known to be problematic to adequately illuminate—there are typically two solutions; accept inadequate illumination or add additional fixtures/poles. If the latter solution is accepted, not only is cost added to the system, but often the poorly controlled light spills over into areas that do not need to be illuminated, wasting what would otherwise be useful light. Alternatively, selection of beam angles 60, 62, 70, and 72 of fixture 1000 permits a designer to direct more light at the target area which may reduce the number of fixtures needed to provide adequate illumination.

B. Exemplary Method and Apparatus Embodiment 1

A more specific exemplary embodiment, utilizing aspects of the generalized example described above, will now be described. The present embodiment utilizes concepts of adjusting how light is aimed in the horizontal plane; of course, this does not preclude adjusting light in the vertical plane as well.

FIG. 4A illustrates the general roadway scenario previously described in which a vehicle 1 travels along a roadway 2; is of note that as illustrated travel in both lanes on either side of median 4 is in the same direction and indicated by arrows. As envisioned, fixtures 100 are aimed so to project light generally forward of vehicle 1 as previously described for fixtures 1000 (and illustrated in FIGS. 2A and B). The spacing between fixtures 100 approximates that of current roadway lighting fixtures (e.g., on the order of 60-80 meters), but because light is directed with traffic the mounting height is greatly reduced (e.g., reduced to a mounting height on the order of 3-6 meters).

Figure 4B:
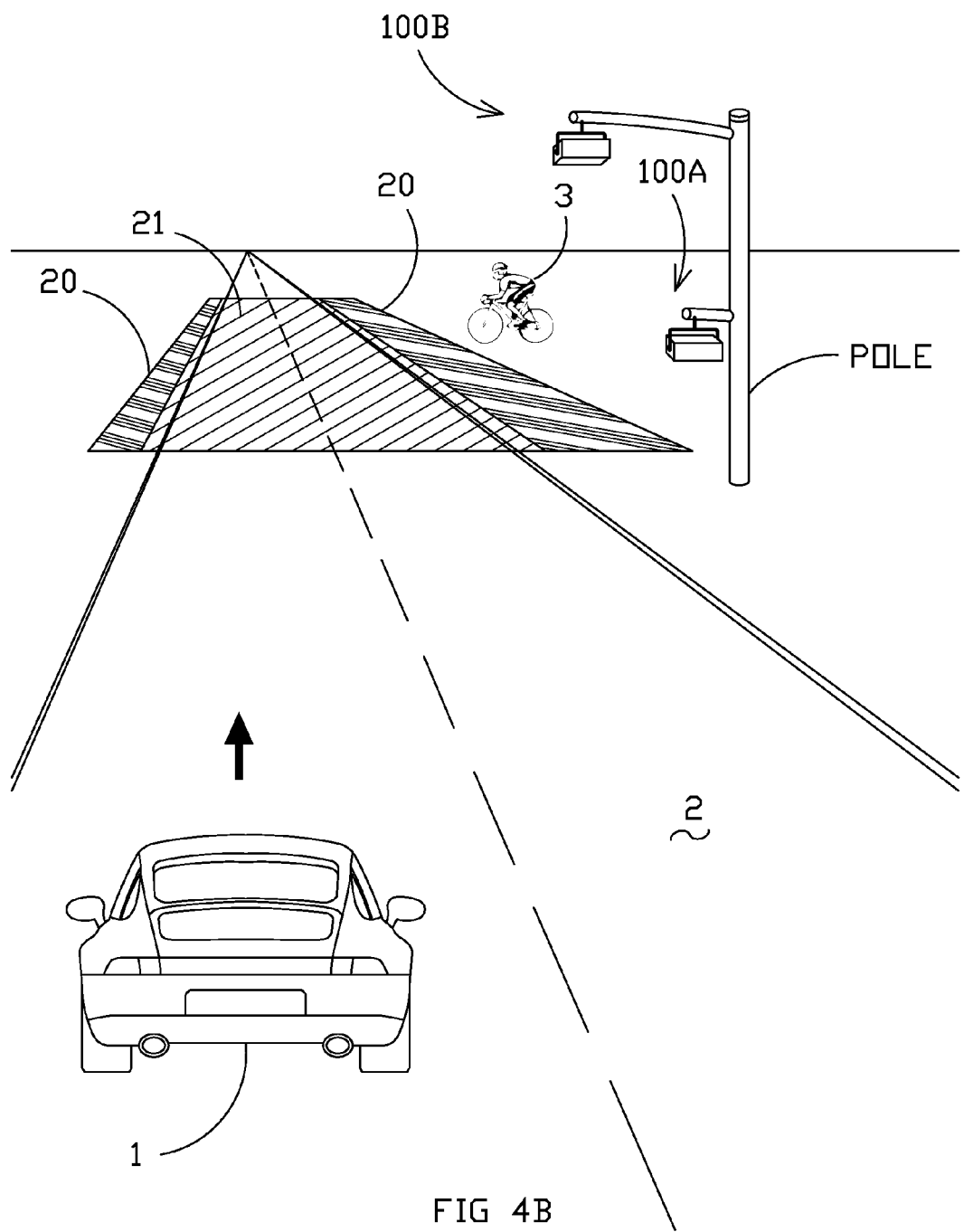
FIGS. 4A and B diagrammatically illustrate illumination of a typical roadway according to a first embodiment.
FIG. 4C illustrates a perspective view of an exemplary apparatus for producing the illumination diagrammatically illustrated in FIGS. 4A and B.

In addition to projecting light in a manner that is not directly viewable by the driver of vehicle 1, some subset of the LEDs in fixture 100 may be aimed so to provide lighting to areas adjacent to roadway 2 (see reference no., 20); the benefit of this is generally illustrated in FIG. 4B in which a driver of vehicle 1 may be able to see an object 3 from a farther distance and/or sooner when adjacent areas 20 are illuminated, even if areas 20 are not as well illuminated as areas 21 in terms of measured light levels. As previously discussed, illumination of areas in the driver's periphery may greatly improve night-time driving visibility.

Figure 4C:
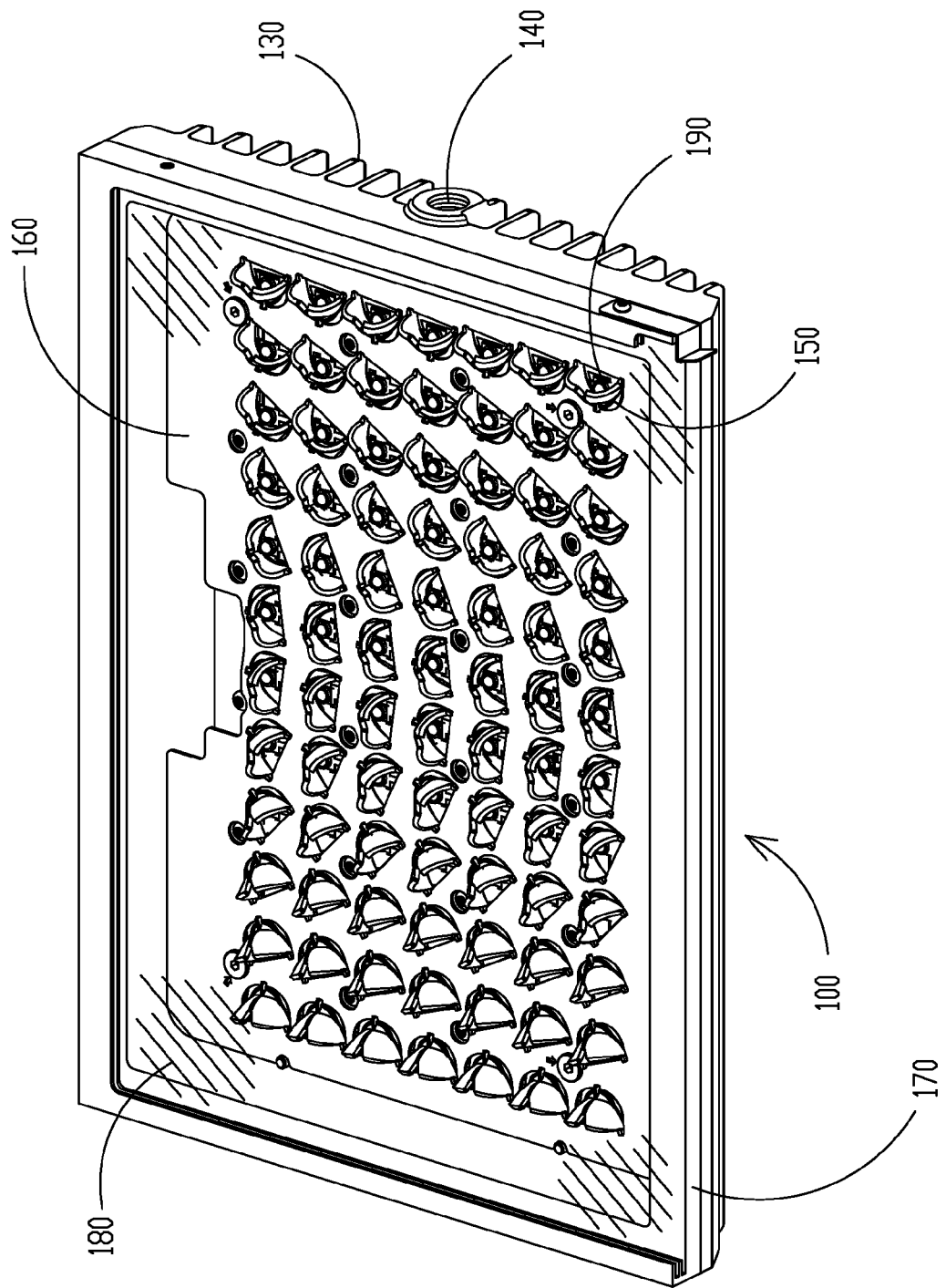

FIG. 4C illustrates fixture 100 as envisioned; as can be seen, fixture 100 generally comprises a weather-tight housing 170 containing a plurality of LEDs 190 (e.g., model XP-E available from Cree, Durham, N.C., USA) each With its own optic 150 (in this example, a reflector) individually aimed and positionally affixed by a plate 160; housing 170 being sealed by a transparent lens 180. Fixture 100 may include some apparatus or method of dissipating heat (as LED life and performance is known to degrade with increasing heat); in this example, heat dissipation is achieved by aluminum housing and integral cooling fins 130, though this is not by way of limitation. Fixture 100 could be affixed to a pole or other support structure by a variety of apparatus or methods; in this example, a yoke may be affixed to fixture 100 via tapped and threaded holes 140 on either side of fixture 100, the yoke being further affixed to the pole (see FIG. 4B). This particular apparatus or method of affixing fixture 100 to a pole permits adjustability in two axes (a first axis through holes 140 and a second axis through the yoke's connection point to the pole) which is adequate for most roadway lighting applications; however, adjustability about a third axis could be permitted depending on the selection of optics (e.g., diffusers) and/or by appropriate apparatus similar in function to the yoke.

In practice, plate 160 could be punched, machined, or otherwise formed so to positionally affix optics 150 in a pattern suitable to achieve a desired beam pattern (see, for example, FIG. 4A); U.S. patent Ser. No. 12/467,160 (now published US2009/0323330) incorporated by reference herein discusses how the light projected from fixture 100 can be adjusted by selective design of plate 160 to suit an application. Once fixture 100 is assembled with a customized plate 160, it may be affixed to a pole or other support structure via the yoke illustrated in FIG. 4A or an analogous component; refinements in aiming can be performed by pivoting fixture 100 about the two axes previously described.

Of course, roadway conditions could change such that changes in fixture 100 may be needed. For example, if roadway 2 is widened and existing LEDs 190 can still provide adequate illumination, then the only change may be to re-aim fixture 100 via pivoting about one or more of the available pivot axes. If the shape of roadway 2 is changed and existing LEDs 190 can still provide adequate illumination, then a new beam pattern could be developed and a new plate 160 installed in fixture 100. If, however, existing LEDs 190 cannot provide adequate illumination (e.g., increasing the power to existing LEDs would severely reduce their operating life), existing LEDs 190 could be switched out for more powerful ones; this may require switching out optics 150 or creating a new plate 160 as well. If such changes are expected then it may be preferable to modify fixture 100 such that each LED 190 may be independently adjustable on site without having to produce a new plate 160; U.S. patent Ser. No. 12/751,519 (now published US2010/0195326) incorporated by reference herein discusses apparatus for achieving such.

Alternatively, roadway conditions could change due to environmental factors. For example, inclement weather (e.g., sand storm, heavy rain, snow, sleet, etc.) which greatly diminishes visibility during daytime or night-time driving could be addressed by envisioned fixture 100. For example, as is well known in the art of lighting the human eye typically has three ranges of vision adaptability in which different parts of the eye are active: the photopic, mesopic, and scotopic ranges. In the photopic range, illumination is relatively abundant (e.g., 30 lux) and the cones of the eye (the part of the eye responsible for color and fine detail detection) are active. In the photopic range, the human eye is adapted such that yellow-green light is most perceivable. In the scotopic range, illumination is relatively scant (e.g., 0.1 lux) and the rods of the eye (the part of the eye responsible for contrast and movement detection) are active. In the scotopic range, the human eye is adapted such that blue light is most perceivable (though the color itself is not detectable). The mesopic range lies between the photopic and scotopic ranges; both cones and rods are active in this range. A night-time driver experiences primarily mesopic vision, though the adjacent areas of the roadway (where an animal or object may enter the roadway) and areas in the driver's periphery fall into the scotopic range; as such, a bluish roadway light may be more preferable than a yellowish roadway light, particularly when driver safety is a concern.

However, light that is of a blue wavelength is known to scatter more than light of a yellow wavelength due to interactions with various particles in the air (i.e., why the sky is perceived as blue) this, coupled with the eye's sensitivity to blue light during night-time driving, may create a visual impairment in the event of an abundance of particles with which the light interacts (e.g., snow, sand, sleet, rain, etc.). As such, it may be preferable that, during a sand storm or snow storm for example, a secondary fixture be used which is equipped with LEDs 190 that project light of a different color than the primary fixture; this is generally illustrated in 4B in which a primary fixture 100B illuminates roadway 2 during normal driving conditions and a secondary fixture 100A supplements fixture 100B during periods of greatly reduced visibility. Secondary fixture 100A is mounted close to the ground (e.g., on the order of a meter) and aimed so to illuminate area 21, not so much to increase the light level of area 21, but to provide a reference point for the driver.

Control of secondary fixture 100A could be enabled on site (e.g., via a manually operated member), but that would likely limit the ability to rapidly respond to changing roadway conditions. It would be beneficial for secondary fixture 100A—and ideally the entire roadway lighting system—to be controlled remotely (at least as an alternative to on-site control); U.S. Pat. Nos. 6,681,110 and 7,778,635 both of which are incorporated by reference herein discuss apparatus and methods of remotely controlling lighting systems. A sensor or analogous device could be installed on site and adapted to provide feedback to supplement the envisioned remote control functionality; a photocell to indicate ambient light levels or a commercially available weather alert sensor (e.g., any model of wireless weather station devices available from Rainwise, Bar Harbor, Me., USA) to indicate rainfall and barometric pressure are but two examples.

C. Exemplary Method and Apparatus Embodiment 2

An alternative embodiment envisions a roadway lighting system which utilizes concepts of adjusting how light is aimed in the vertical plane; of course, this does not preclude adjusting light in the horizontal plane as well.

Figure 5A:
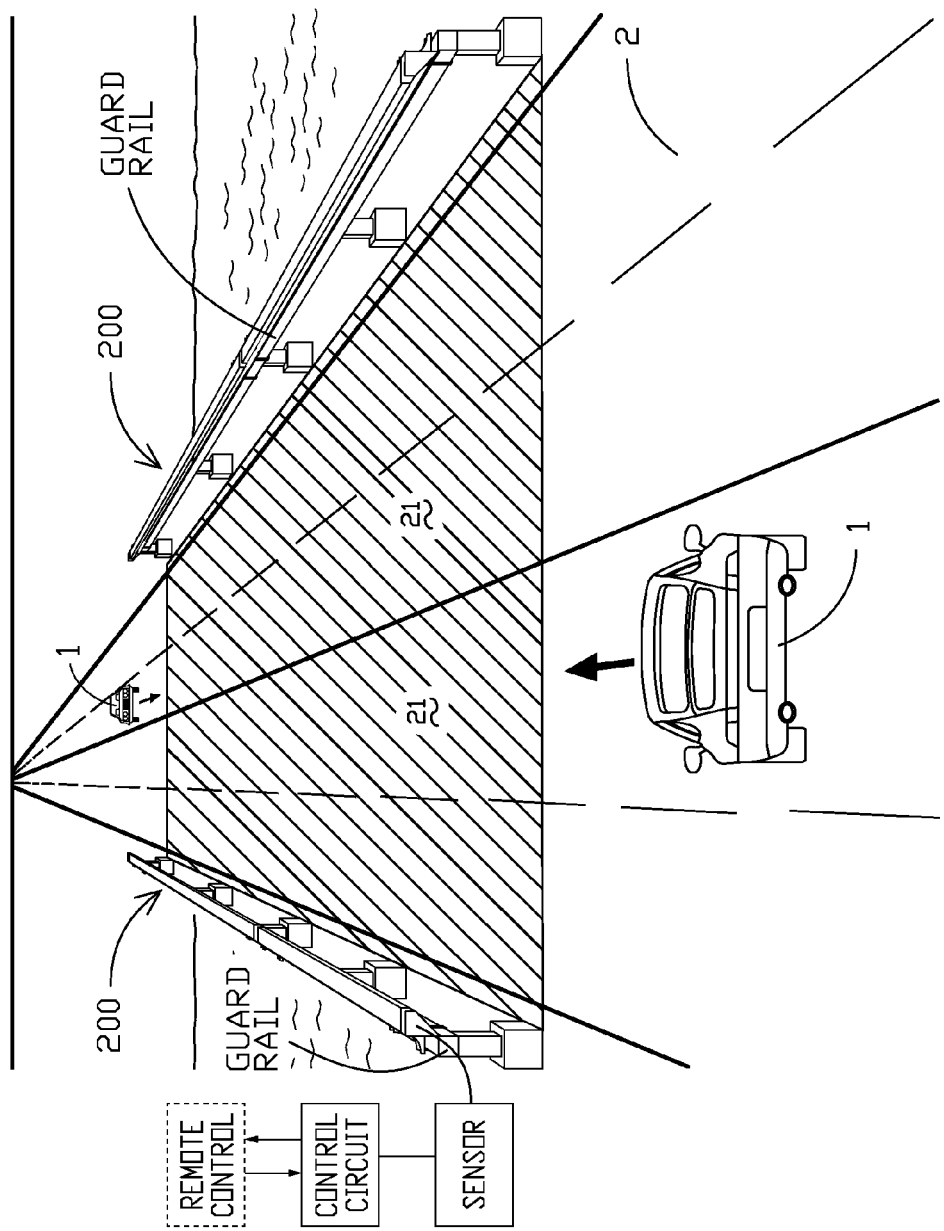
FIG. 5A diagrammatically illustrates illumination of a typical roadway according to an alternative embodiment.
Figure 5C:
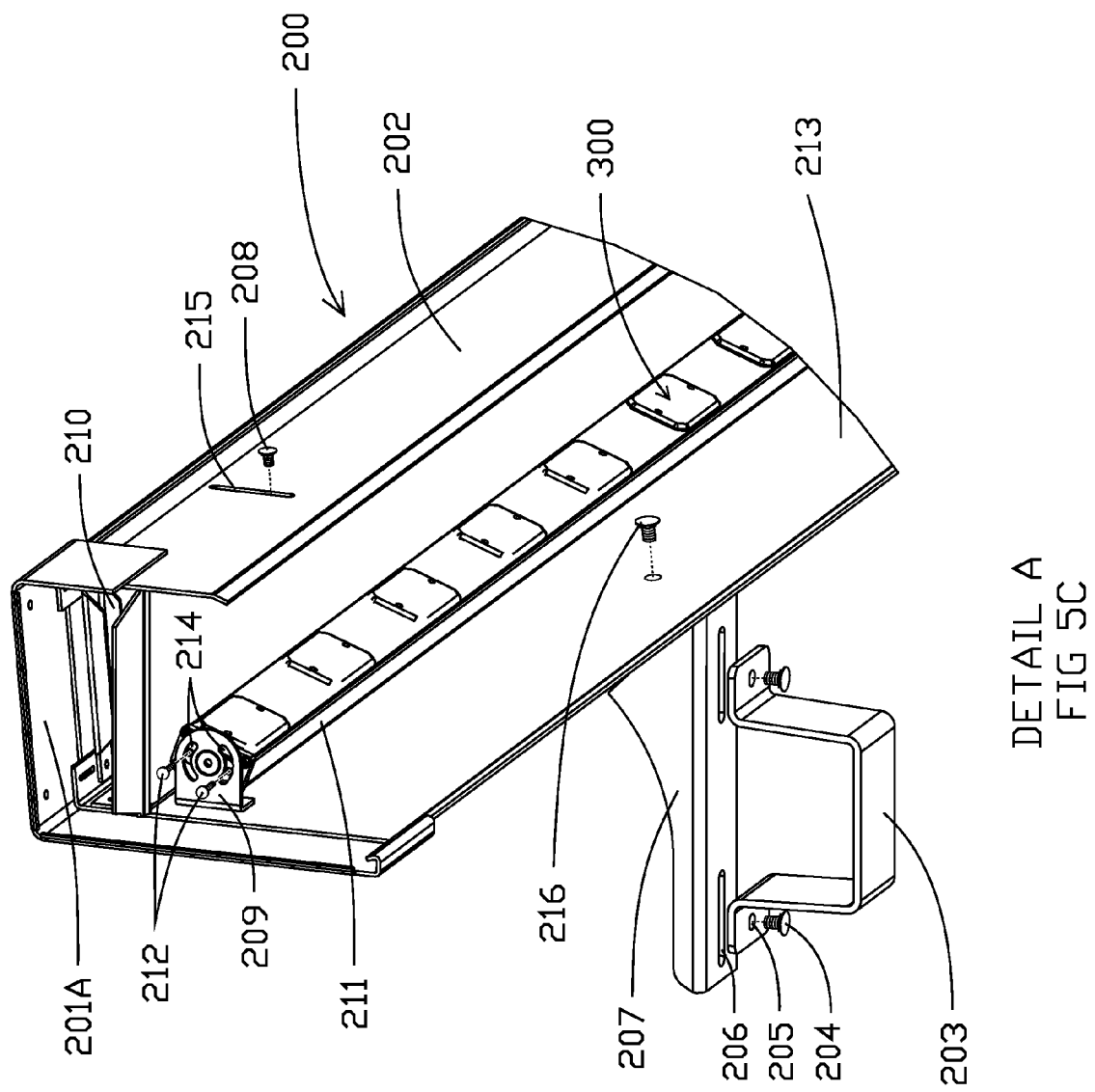
Figure 5D:
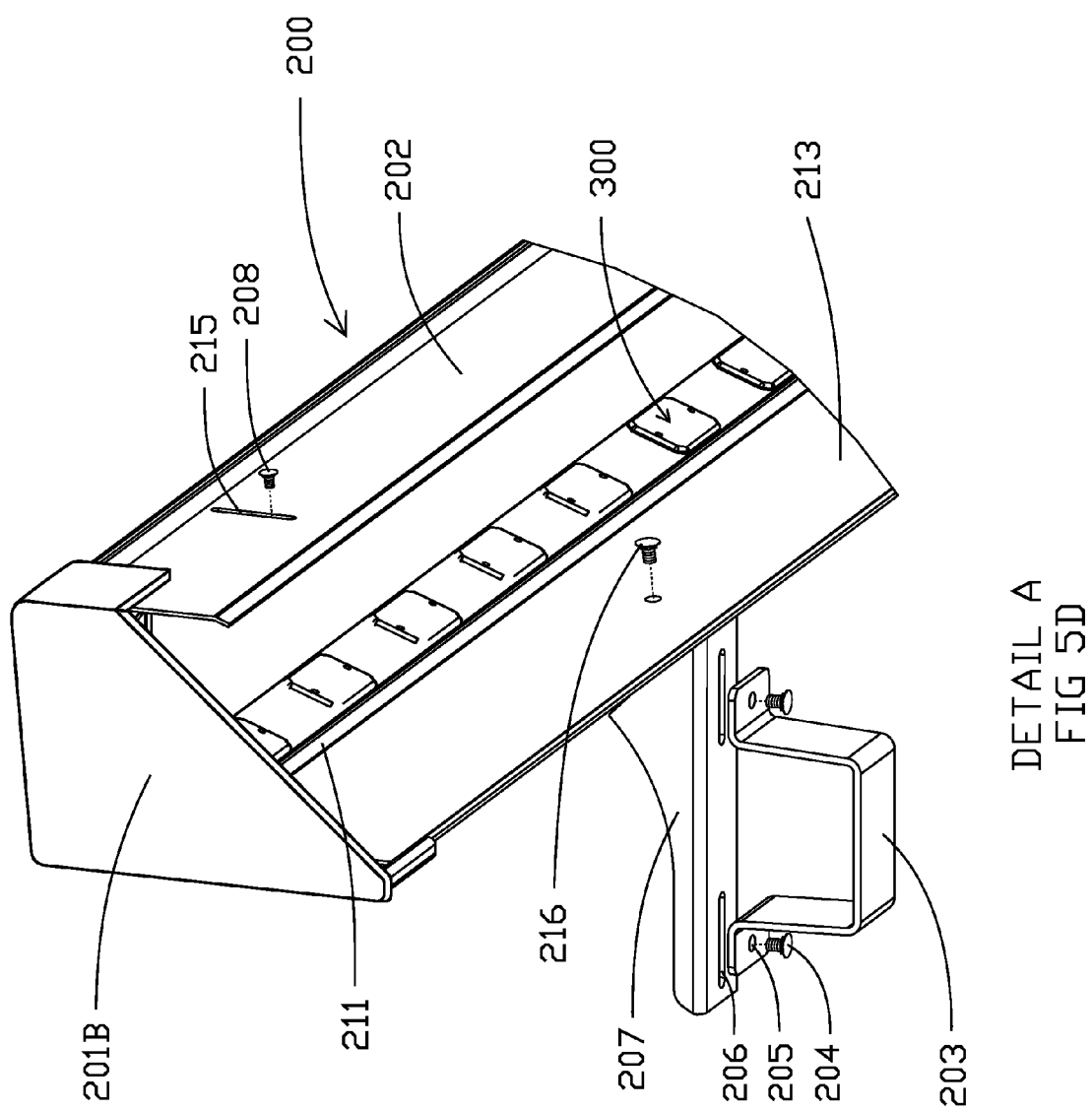

FIG. 5A illustrates a general roadway scenario in which four lanes of traffic flow across a bridge, two lanes in each direction in accordance with vehicles 1 and arrows projecting therefrom. As envisioned, fixtures 200 are affixed to existing guardrails on the bridge, primarily to eliminate the cost of a support structure; this is achieved via a bracket 203 and support arm 207 (see FIGS. 5B-D). As designed, bolts 204 extend through aperture 205 in bracket 203 and aperture 206 in arm 207 and are secured by a nut or analogous component (not illustrated). Arm 207 is fixed to fixture 200 (e.g., by bolts 216 and/or other methods including but not limited to screws, rivets, welding, and adhesives). Aperture 206 is purposefully sized to allow for curvature or unevenness of the guardrails, though this is by way of example and not by way of limitation. For example, if fixtures 200 were used to illuminate a roadway in a tunnel, fixture 200 could be bolted directly to the tunnel wall via bolt or analogous device through housing 213 and bracket/arm 203/207 omitted from the design. Alternatively, if no existing structural features were suitable, fixtures 200 could be mounted on a provided pole in a fashion similar to that illustrated in FIGS. 3A and B. The exact length of fixtures 200 and the number of LEDs contained therein can vary depending on the availability, size, and spacing of existing structural features such as guardrails, or according to some other need or preference. For example, FIG. 5B illustrates a single fixture 200 containing two housings 211 each of which contains ten LED assemblies 300; as envisioned, fixture 200 is three or more meters in length with each housing 211 a meter or more in length, though this can vary depending on the needs of the application.

Each fixture 200 is joined to the next fixture via connector 201 to provide a continuous string of lights along roadway 2; this ensures both uniformity in lighting and provides a reference for indicating the edge of roadway 2 (discussed later). The exact form of connector 201 depends on the position of fixture 200 in the assembled lighting system. For example, fixtures 200 at each end of the assembled lighting system are equipped with connector 201B (see FIG. 5D) so to prevent glare as a vehicle approaches area 21 (see fixtures 200 in FIG. 5A); all interposed fixtures 200 are equipped with connector 201A (see FIG. 5C). The interaction between connector 201 and housing 213 is illustrated in greater detail in FIGS. 5F and 5G, which are section views along line A-A illustrated in FIG. 5B (i.e., a section view taken through the outermost LED assembly 300 looking along the length of fixture 200).

Fixtures 200 are designed to be adjustable in the vertical plane via pivoting of housing 211 about its longitudinal axis; this is achieved via movement of bolts 212 through apertures 214 in plate 209; FIG. 5E is an exploded view of the components between housing 211 and plate 209 according to Detail A of FIG. 5B. As can be seen from FIG. 5E, housing 211 is affixed to an end cap 400 via bolts 401 extending through end cap 400, through sealing gasket 500, and into slots 220. End cap 400 is positioned in plate 209 and positionally held by bolts 212 extending through apertures 214. Loosening bolts 212 allows housing 211 to pivot about an axis extending through the center circular void of plate 209 and along the length of housing 211. As designed, pivoting of housing 211 is limited only by the travel of bolts 212 in apertures 214; in this example housing 211 may pivot approximately 90 degrees (see FIGS. 5F and G), though this is by way of example and not by way of limitation.

A primary purpose of end cap 400 is to seal housing 211 on either end and, similar to connectors 201, the exact form of end cap 400 depends on its position within fixture 200. For example, as can be seen in FIG. 5B each fixture 200 comprises two housings 211. The end of the two housings closest to each other (i.e., nearest the center of fixture 200) are equipped with end cap 400B (see FIGS. 7A and B). Surface 431 of end cap 400B is in abutment with housing 211 and is adapted to receive wiring (not illustrated) associated with LEDs 190. Surface 430 of end cap 400B projects outward from housing 211 and is adapted to receive a cable grip (e.g., any model of PROGRESS® available from Agro, Hunzenschwil, Switzerland); as is well known in the art, a cable grip helps to transport wiring or other objects in/out of an enclosure while maintaining a seal and protecting against moisture and other environmental conditions. Wiring (not illustrated) from LED assemblies 300 in both housings 211 are run from the aforementioned cable grip into void 210 of fixture 200 (see FIGS. 5F and G), preferably encapsulated in conduit. As envisioned, void 210 of fixture 200 houses other electrical equipment (e.g., driver) associated with the operation of solid-state light sources such as LEDs 190, void 210 being primarily shielded from environmental conditions due to the construction of fixture 200.

Figure 7B:
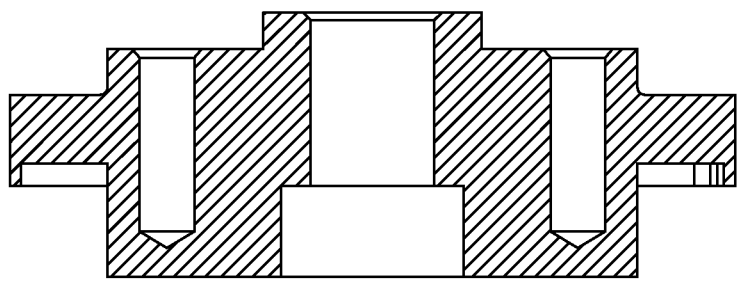
Figure 7E:
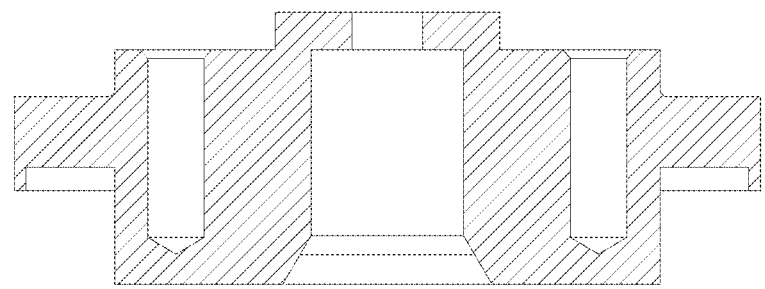
Figure 7D:
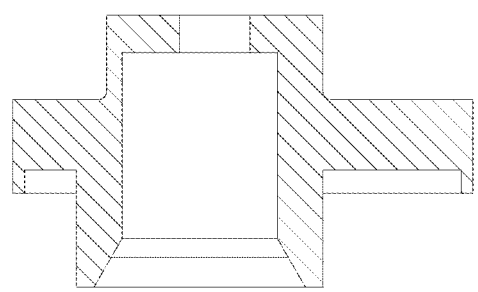

Alternatively, the opposite ends of housings 211 (i.e., the ends nearest connector 201) are equipped with end cap 400A (see FIGS. 7C-E). Surface 432 of end cap 400A projects outward from housing 211 and is adapted to seat in the center circular void of plate 209. Surface 433 of end cap 400A is in abutment with housing 211 and is adapted to receive a protective vent (e.g., any model of PolyVent available from W.L. Gore and Associates, Newark, Del., USA); as is well known in the art, a protective vent helps to prevent pressure buildup and contamination of sealed enclosures.

Figure 6A:
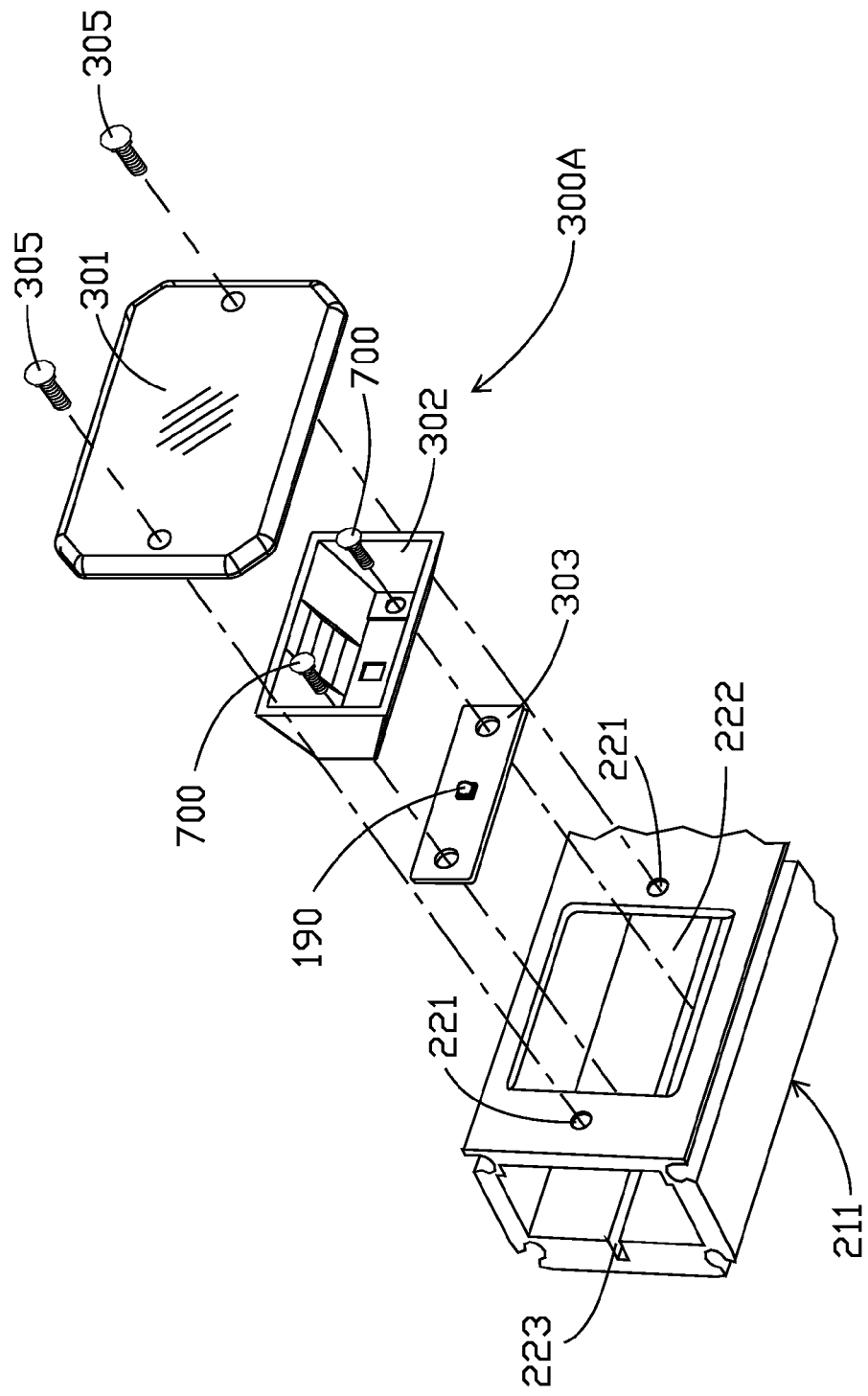
FIGS. 6A and B illustrate exploded perspective views of two exemplary LED assemblies.

LED assemblies 300 generally comprise an LED 190 (e.g., model XP-E available from Cree, Durham, N.C., USA) mounted to a board 303, some form of optic, and an outer lens 301 which seals against housing 211 via bolts 305 (through apertures 330) into apertures 221 and a gasket (not illustrated) in channel 331 (see FIG. 6C) which bounds opening 222. FIG. 6A illustrates an exploded view of one possible assembly 300A; in this assembly the optic comprises a reflector 302. As can be seen from FIGS. 6A and D, reflector 302 comprises a metalized portion 803 which shapes the light projected from LED 190 into a generally elliptical beam pattern, opaque portions 802 which may also be reflective but are primarily designed to provide a desired cutoff, aperture 804 through which LED 190 passes, and apertures 801 in posts 800 through which bolts 700 pass. In practice, bolts 700 are threaded into channel 223 of housing 211 such that board 303 is compressed between housing 211 and reflector 302 via posts 800; this is illustrated in assembly 300 of FIGS. 5F and 5G.

Figure 6B:
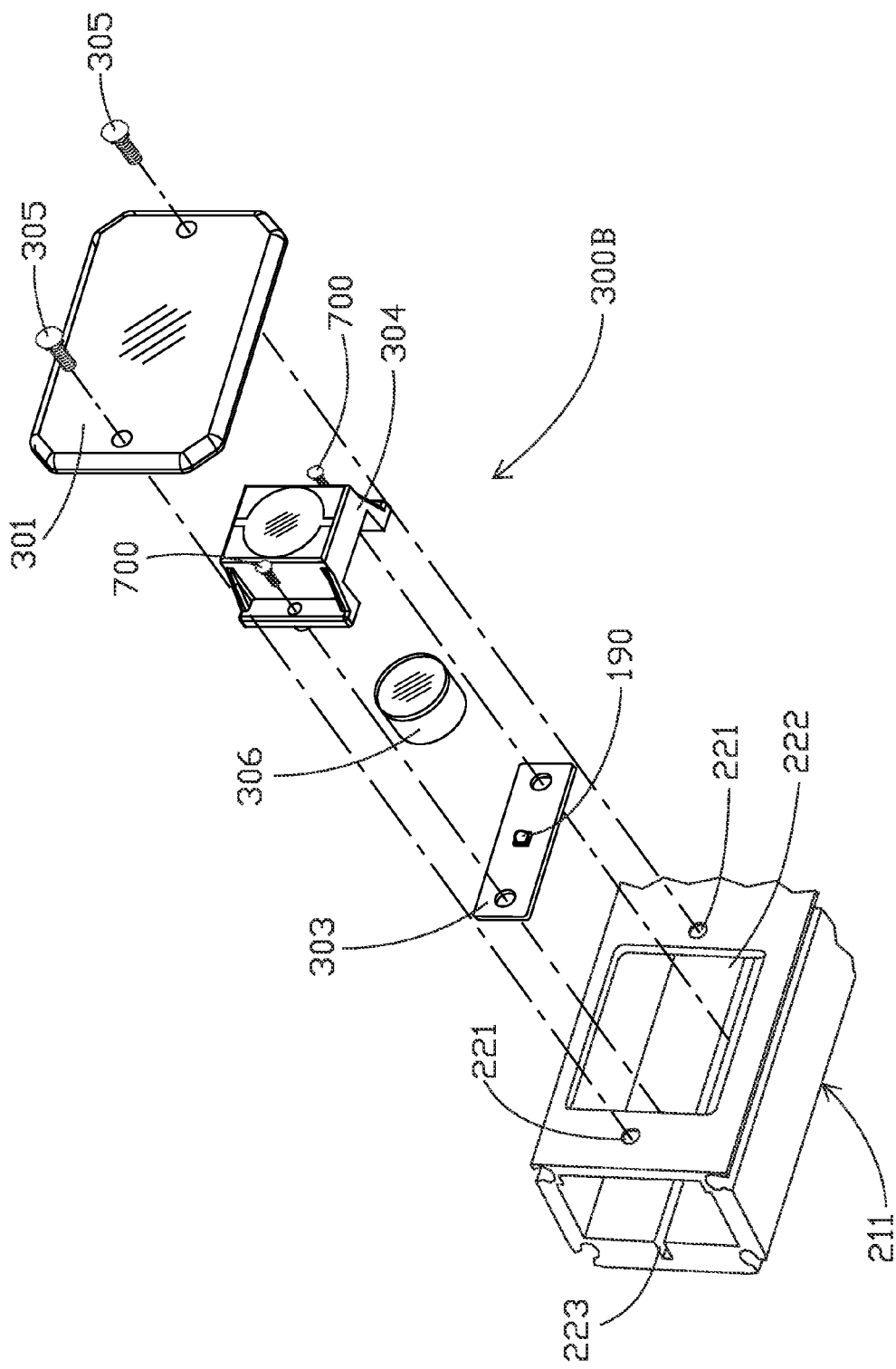
FIGS. 6C-E illustrate various views of outer lens 301, reflector 302, and holder 304, respectively, used in the two exemplary LED assemblies of FIGS. 6A and B.

An alternative assembly 300B is illustrated in FIG. 6B; in this assembly the optic comprises a total internal reflection (TIR) lens 306 (e.g., any of the PCP Series available from Fraen Corporation, Reading, Mass., USA) combined with a diffuser 900 (e.g., any of the LIGHT SHAPING DIFFUSERS® available from Newport Corporation, Irvine, Calif. USA). Similar to assembly 300A, assembly 300B is designed to project a generally elliptical beam; in this example, diffusion sheet 900 produces a 35×75° elliptical beam pattern. Diffuser 900 is positioned within a holder 304 via tabs 901 (see FIG. 6E), though this is by way of example and not by way of limitation. For example, a custom lens could be designed which would achieve the functionality of the combination of lens 306 and diffuser 900, thus allowing holder 304 to be omitted from the design. In practice, bolts 700 are threaded into channel 223 of housing 211 in a manner similar to that described for assembly 300A such that board 303 and TIR lens 306 are compressed between housing 211 and holder 304 via posts 800.

Adjustability of LED assemblies 300 in the vertical plane is supplemented by a visor 202 (see FIGS. 5B-D and 5F and G) which serves to (i) provide a distinct cutoff when desired and (ii) direct some light from LED assemblies 300 back into fixture 200 so to provide indirect lighting (i.e., lighting where the source is not in direct view of a driver) that serves as a reference point for drivers. As designed, a carriage screw 208 extends through slot 215 in visor 202 and is secured by a nut or analogous component (not illustrated), the length of slot 215 defining the range of vertical travel of visor 202 (in this example, on the order of several centimeters). FIG. 5F illustrates visor 202 fully lowered and leaving a gap 218 between visor 202 and upper housing portion 213D. Upper portion 213D (designed to structurally support connector 201 and form void 210) is affixed to housing portion 213C (designed to structurally reinforce fixture 200) and lower housing portion 213B (designed to form void 210), lower housing portion 213B being further affixed to back lousing portion 213A (designed to support plate 209 and interface with bracket/arm 203/207). FIG. 5G illustrates visor 202 when fully raised so to eliminate gap 218.

In practice, one could loosen bolts 212, pivot housing 211 so to adjust the vertical aiming of LEDs 190, tighten bolts 212, loosen carriage bolts 208, adjust visor 202 so to provide a desired cutoff and sufficient indirect lighting, and tighten carriage bolt 208; alternatively, visor 202 could be adjusted prior to aiming LED assemblies 300. Of course, care must be taken not to aim LEDs 190 such that light projects through slot 215 of visor 202 as the result would be striations in area 21 (i.e., non-uniform lighting). After appropriate aiming of fixtures 200, operation of said fixtures could be enabled on site and/or remotely as described in Exemplary Method and Apparatus Embodiment 1.

D. Options and Alternatives

The invention may take many forms and embodiments. The foregoing examples are but a few of those. To give some sense of some options and alternatives, a few examples are given below.

Apparatus and methods for adjusting horizontal aiming (as described in Exemplary Method and Apparatus Embodiment 1) and vertical aiming (as described in Exemplary Method and Apparatus Embodiment 2) of solid-state light sources described herein could be applied to lighting systems other than those intended for roadways, bridges, tunnels, parking lots, and areas adjacent to such. Further, apparatus and methods for horizontal and vertical aiming may be combined in a single lighting system for such applications without departing from at least some aspects of the present invention.

Described herein are a variety of bolts, brackets, yokes, and other devices for fastening some portion of the present embodiment(s) to some other part of the present embodiment(s) or support structure; it is of note that apparatus and methods of fastening parts may differ from those described herein and not depart from at least some aspects of the present invention. For example, portions 213A-D of housing 213 could be welded instead of bolted (as illustrated). Alternatively, housing 213 could be machined or otherwise formed from a single part. As another example, visor 202 could be positionally affixed using a clamp-type device instead of bolt 208 through slot 215. As still another example, fixtures 100 could be affixed to a pole or other support structure using a similar apparatus to bolt/slot 208/215 rather than a yoke.

Also described herein is a plurality of LEDs as well as associated optics housed within a fixture. As has been stated, other solid-state light sources could be used and not depart from at least some aspects of the present invention. Beyond that, though, the optics for said light sources could be varied according to need (e.g., to project a beam pattern of a particular size or shape). For example, one LED 190 could use a TIR lens whereas another could use a light reflecting or blocking tab/visor, and still another use a reflector. Of course, there are other options for the light sources as well. For example, the solid-state light sources could be any number of available colors, a fixture could comprise any number or type of solid-state light sources, and the light sources themselves could be laid out in any formation within a fixture (e.g., in a spiral pattern); some of these options could be selected for aesthetic purposes in addition to achieving the benefits described herein.

As has been stated, the envisioned roadway lighting system is designed to provide adequate lighting without impairing a driver's vision while being a cost-effective alternative to traditional roadway lighting; cost-effectiveness is primarily achieved by reducing or eliminating the cost of mounting structures, however, there are other cost savings which could be realized according to aspects of the present invention. For example, it is well known that LEDs have a long operating life (e.g., on the order of several thousand hours longer than a traditional MH or HPS light source). This, combined with the higher efficacy of LEDs compared to some traditional light sources (i.e., LEDs produce more luminous output per watt of power than some traditional light sources), makes LEDs a cost-effective alternative for roadway lighting. A control circuit would be connected to the fixtures to supply and control power to the light sources (e.g., diagrammatically illustrated at FIG. 5A).

Additionally, remote control functionality of the envisioned lighting system may contribute to cost savings. For example, it is well known that LEDs are readily dimmable; the operation at a dimmed level, itself, provides cost savings. It is possible for a motion sensor or the like (e.g., FIG. 5A) to be included with the lighting system such that feedback from the sensor could be communicated (e.g., wired, wireless, or combination two-way communication) to the remotely located control center (e.g., FIG. 5A)—or trigger an immediate response—to regulate the power provided to the LEDs. So, for example, a stretch of road that does not typically receive traffic during the midnight hours could be dimmed; however, when a sensor associated with the system detects a vehicle, power to the lights could be gradually increased to provide the desired illumination. The sensor could be placed a significant distance away from illuminated areas 21 (e.g., ¼ km) if desired so that the increase in illumination would not be distracting to the driver.

What is claimed is:

1. A method of lighting one or more lanes of traffic, each lane having a designated direction of travel and estimated eye height of drivers above the lane, comprising:
   a. mounting one or more solid-state light sources along the lane and at or near said estimated eye height for a said lane;
   b. aiming the one or more solid-state light sources at or below said estimated eye height relative a vertical plane to deter direct view of the one or more solid-state light sources by drivers passing in the direction of travel of the lane;
   c. aiming the one or more solid-state lights sources angularly forward in the direction of travel relative to a horizontal plane to deter direct view of the one or more solid-state light sources by drivers passing in the direction of travel of the lane; and
   d. controlling at least a portion of the light projected from the one or more solid-state light sources so to illuminate the one or more lanes of traffic according to predetermined criteria.

2. The method of claim 1, further comprising controlling a portion of the light projected from the one or more solid-state light sources so to provide indirect lighting for the purpose of providing a reference point for drivers.

3. The method of claim 1 wherein the predetermined criteria comprises a specified light level and uniformity.

4. A system for lighting a roadway, path, tunnel, or bridge, and areas adjacent to such, comprising:
   a. a plurality of solid-state light sources, a first subset of which project a first composite illumination pattern on the roadway, path, tunnel, or bridge and a second subset of which project a second composite illumination pattern on the areas adjacent to such;
   b. at least one optical element associated with each light source, the optical element adapted to modify the composite illumination pattern of its subset;
   c. one or more housings containing the light sources and associated optical elements, the one or more housings sealed against environmental conditions;
   d. the one or more housing pivotably mounted to a support structure; and
   e. wherein one or more of the following is selectable so to project the first and second composite illumination patterns in a manner that (i) meets separate predefined criteria for each illumination pattern and (ii) avoids predefined undesirable lighting effects:
      i. pivoting of one or more housings relative to the support structure;
      ii. number, color, and layout of solid-state light sources contained in a housing;
      iii. number, type, and layout of optical elements contained in a housing.

5. The system of claim 4 further comprising a remotely located control center, a power control device located proximate the solid-state light sources adapted to control power to the solid-state light sources, and a wireless communication link between the remotely located control center and the power control device, wherein the remotely located control center is adapted to control the power provided to the plurality of solid-state light sources remotely.

6. The system of claim 5 further comprising a sensor in operative communication with the remotely located control center and adapted to detect one or more of:
   a. light output of the one or more solid-state light sources;
   b. barometric pressure;
   c. ambient light;
   d. presence of a user of the roadway, path, tunnel, or bridge;
   e. speed of a user of the roadway, path, tunnel, or bridge; and
   f. weather alerts.

7. The system of claim 6 wherein the control of one or more light source is in response to detection by the sensor.

8. The system of claim 4 wherein the lighting is generally continuous along the roadway, path tunnel, or bridge, and areas adjacent to such.

9. A system for illuminating roadways adapted for a variety of motor vehicles each motor vehicle having a tallest dimension over a range of vehicle tallest dimensions and a driver's compartment below the tallest dimension comprising:
   a. a lighting fixture producing a generally directional fixture light output distribution pattern comprising:
      i. a housing comprising:
         1. a mounting interface on the housing adapted for mounting the lighting fixture to a supporting structure, wherein the mounting interface of the housing of the lighting fixture allows adjustable orientation of the housing relative the roadway
         2. a side from which issues the generally directional fixture light output pattern;
         ii. a plurality of solid-state light sources pivotably mounted within the housing, each solid-state light source having an initial light output distribution which is selectively adjustable relative the roadway by both (i) adjusting orientation of the housing relative the roadway and (ii) pivoting the solid-state light sources within the housing;
         iii. an electrical circuit operatively connected to the solid-state light sources adapted to provide and control electrical power to the solid-state light sources;
         iv. the generally directional fixture light output distribution pattern of the lighting fixture created by modifying the initial light output distributions into final light output distributions of the solid-state light sources by:
            1. an optic sub-system at each solid-state light source which creates an intermediate solid-state light source light output distribution for each light source; and
            2. a light control sub-system either at each solid-state light source or at the side of the housing which selectively cuts-off or limits a portion of the intermediate solid-state light source light output distribution;
            3. so that the final light output distributions have both light output distribution and light out-off and control aspects;
   b. a plurality of said lighting fixtures installed along the roadway with the generally directional fixture light output distribution pattern of each lighting fixture aimed to present:
      i. a coordinated illumination relative to the roadway and vehicles on the roadway;
      ii. with plural solid-state light sources;
      iii. with directional and glare control aspects.

10. The system of claim 9 wherein at least some of the lighting fixtures are installed below the tallest dimension of the range of vehicle tallest dimensions.

11. The system of claim 9 wherein at least some of the lighting fixtures are installed above the tallest dimension of the range of vehicle tallest dimensions.

12. The system of claim 9 wherein the generally directional fixture light output distribution pattern of each lighting fixture is aimed below the tallest dimension of the range of vehicle tallest dimensions.

13. The system of claim 9 wherein the optic sub-system is interchangeable based on pre-determined design criteria.

14. The system of claim 9 wherein the optic sub-system comprises a reflector to capture and control at least a substantial amount of the initial light output distribution of the light source.

15. The system of claim 9 wherein the optic sub-system comprises a lens in combination with a diffuser.

16. The system of claim 9 wherein the light control sub-system comprises a visor in the intermediate solid-state light source light output distribution of one or more light sources.

17. The system of claim 16 wherein the visor directs at least a portion of the intermediate solid-state light source light output distribution back into the housing so to provide a reference luminance.

18. The system of claim 16 wherein the visor is at, near or incorporated in the optic sub-system for individual light sources.

19. The system of claim 16 wherein the visor is at, near, or incorporated in the housing of the fixture and controls light from plural light sources.

20. The system of claim 9 wherein the final light output distributions of the light sources are coordinated relative to:

a. general direction of the fixture light output distribution pattern relative to drivers in vehicles on the roadway;
   b. general view of the light sources in the lighting fixtures by drivers in vehicles on the roadway; and
   c. amount of illumination at or near the roadway.

21. The system of claim 9 wherein optic sub-systems and light control sub-systems are adjustable or interchangeable into the lighting fixtures.

22. The system of claim 9 wherein the initial light output distribution of a sub-set of light sources is of a different color than other light sources in the fixture or relative to other fixtures.

23. The system of claim 9 further comprising a control component operatively connected to the electrical circuit of the lighting fixture.

24. The system of claim 23 wherein the control component comprises a circuit to sense a parameter related to illumination of the roadway and use the sensed parameter to control operation of the lighting fixtures or report to a remote center.

25. The system of claim 24 wherein parameter comprises one or more of environmental condition at the roadway, light output of the light sources or fixture, time of day, and/or presence of a vehicle.

26. The system of claim 9 further comprising a remote center in operative communication with the lighting system for data gathering or remote control of the lighting system.

27. The system of claim 9 wherein the housing further comprises a first substrate with an array of light sources mounted on it and a second substrate with a corresponding array of optic sub-systems for each light source mounted over the first substrate.

28. A method of illuminating a roadway portion adapted for a variety of motor vehicles along a designated direction of traffic, comprising:
   a. determining an illumination level for the roadway;
   b. determining a mounting height and location for lighting fixtures relative the roadway portion;
   c. providing a plurality of lighting fixtures each having a plurality of solid-state light sources and which produce generally directional fixture light output distribution patterns according to:
      i. aiming the generally directional fixture light output distribution patterns generally along the designated direction of traffic of vehicles on the roadway portion;
      ii. controlling light output of each individual solid-state light source and the plural lighting fixtures to meet the illumination level for the roadway portion; and
      iii. controlling light output of the plural lighting fixtures to deter glare to vehicles on the roadway portion; and
   d. controlling power to the light sources in response to a condition wherein the step of controlling power to the light sources comprises one or more of:
      i. turning the light sources on or off;
      ii. reducing power to the light sources; and
      iii. turning selected light sources on or off;
   e. wherein the condition comprises one or more of:
      i. reduced visibility at the roadway; and
      ii. presence of an object on the roadway.

29. The method of claim 28 wherein the mounting height is at or near the eyes of drivers in vehicles on the roadway.

30. The method of claim 28 wherein the illumination level is determined from pre-determined lighting regulations or specifications of a third party.

31. The method of claim 28 wherein the step of controlling light output of each individual light source to meet said illumination level comprises utilizing reflectors, lenses, diffusers, or other optics.

32. The method of claim 28 wherein the step of determining the mounting height and location of lighting fixtures relative the roadway comprises determining the width of the roadway and determining the height of a typical driver on the roadway.

33. The method of claim 28 wherein the step of controlling light output of the plural lighting fixtures to deter glare comprises blocking or redirecting at least a portion of the light from the individual light sources.

34. The system of claim 4 wherein the separate predefined criteria comprises separate color or light level for the first and second composite illumination patterns, and wherein the predefined undesirable lighting effects comprises glare.

* * * * *

UNITED STATES PATENT AND TRADEMARK OFFICE
CERTIFICATE OF CORRECTION

| | | |
|---|---|---|
| PATENT NO. | : 8,517,566 B2 | Page 1 of 1 |
| APPLICATION NO. | : 12/887595 | |
| DATED | : August 27, 2013 | |
| INVENTOR(S) | : Myron Gordin | |

It is certified that error appears in the above-identified patent and that said Letters Patent is hereby corrected as shown below:

In the Claims

Col. 13, Claim 4, Line 18: "housing" should be --housings--

Col. 13, Claim 8, Line 52: "path tunnel," should be --path, tunnel,--

Col. 16, Claim 34, Line 37: "comprises separate" should be --comprises a separate--

Signed and Sealed this
Twenty-second Day of October, 2013

Teresa Stanek Rea
*Deputy Director of the United States Patent and Trademark Office*